(12) United States Patent
Wang et al.

(10) Patent No.: US 11,995,052 B1
(45) Date of Patent: May 28, 2024

(54) SYSTEM AND METHOD FOR CATEGORICAL DRIFT DETECTION

(71) Applicant: Splunk Inc., San Francisco, CA (US)

(72) Inventors: Zhaohui Wang, San Francisco, CA (US); Ryan Gannon, San Francisco, CA (US); Xiao Lin, San Jose, CA (US); Chandrima Sarkar, Dublin, CA (US)

(73) Assignee: Splunk Inc., San Francisco, CA (US)

( * ) Notice: Subject to any disclaimer, the term of this patent is extended or adjusted under 35 U.S.C. 154(b) by 74 days.

(21) Appl. No.: 17/591,528

(22) Filed: Feb. 2, 2022

Related U.S. Application Data

(60) Provisional application No. 63/285,997, filed on Dec. 3, 2021.

(51) Int. Cl.
*G06F 16/215* (2019.01)
(52) U.S. Cl.
CPC .................................. *G06F 16/215* (2019.01)
(58) Field of Classification Search
CPC ..................................................... G06F 16/215
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,872,031 B2 | 12/2020 | Ross | |
| 2013/0262368 A1* | 10/2013 | Wolff | G06N 5/02 706/52 |
| 2017/0357897 A1* | 12/2017 | Adlakha | G06N 5/043 |
| 2019/0098106 A1 | 3/2019 | Mungel et al. | |
| 2020/0012900 A1* | 1/2020 | Walters | G06N 20/00 |
| 2021/0125104 A1* | 4/2021 | Christiansen | G06N 20/10 |

OTHER PUBLICATIONS

Z. Wang et al. "System and Method for Changepoint Detection in Streaming Data," filed Feb. 2, 2022, U.S. Appl. No. 17/591,511 including its prosecution history.

(Continued)

*Primary Examiner* — Maher N Algibhah
(74) *Attorney, Agent, or Firm* — Rutan & Tucker LLP

(57) ABSTRACT

A computerized method for detection of categorical drift within an incoming data stream. Herein, an error threshold is computed based on a first set of training data samples selected to detect categorical drift occurring for a data stream. Thereafter, probability distributions associated with content of a first and second data samples of the data stream are computed. Analytics are conducted to compute a difference between content of the first probability distribution that is based on a first data point of the first data sample and content of the second probability distribution that is based on a first data point of the second data sample. After computing the difference, that categorical drift is determined whether categorical drift detection has been conducted.

24 Claims, 26 Drawing Sheets

(56) References Cited

OTHER PUBLICATIONS

Z. Wang et al. "System and Method for Format Drift and Format Anomaly Detection," filed Feb. 2, 2022, U.S. Appl. No. 17/591,535 including its prosecution history.

Bretz, P. et al., "Notes on Bayesian Changepoint Detection" pp. 1-12, Nov. 19, 2020.

Ruggieri, E. et al., "Short Communication—A Bayesian approach to detecting change points in climatic records" DOI:10.1002/joc.3447. Int. J. Climatol. (2012).

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

K. Curtis, et al. "Automated Determination of Tuned Parameters for Analyzing Observable Metrics," filed Jan. 31, 2023, U.S. Appl. No. 18/103,966 including its prosecution history.

K. Curtis, et al. "Hyperparameter Tuning for Anomaly Detection Service Implementing Machine Learning Forecasting," filed Oct. 31, 2022, U.S. Appl. No. 17/978,153 including its prosecution history.

K. Curtis, et al. "System and Method for Automated Determination of Search Query Parameters for Anomaly Detection," filed Jun. 10, 2022, U.S. Appl. No. 17/837,931 including its prosecution history.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Splunk, Inc., "Setup Detectors and Alerts for Actionable Insights." https://www.youtube.com/watch?v=2Gvw_DACcWc, dated Sep. 16, 2021.

* cited by examiner

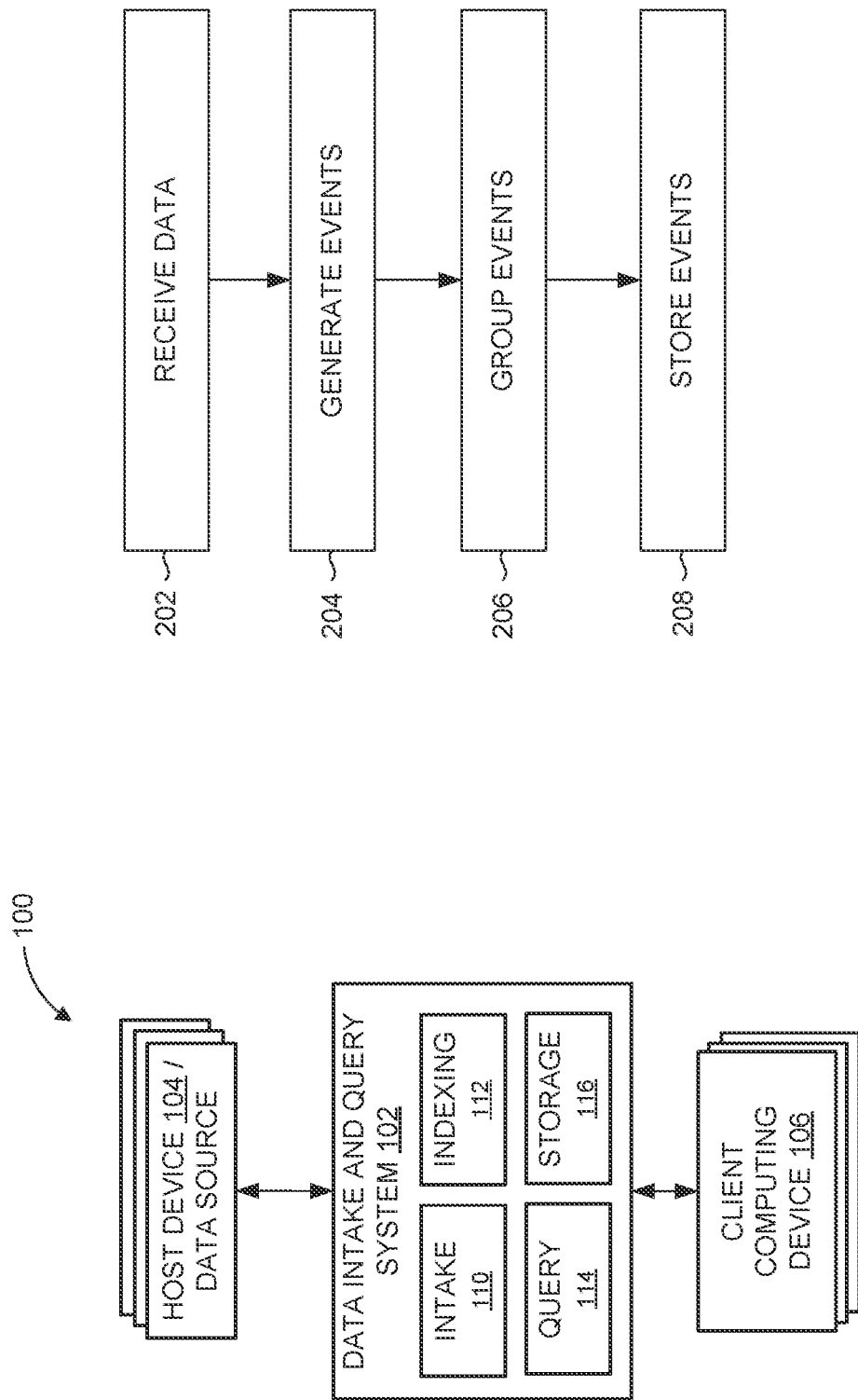

```
                                    ┌─ 302
                                    ↓
                                              ┌─ 302A
127.0.0.1 -- eva [10/Oct/2000:13:55:36-0700] "GET/apache.gif HTTP/1.0" 200  2326  0.0947
127.0.0.1 -- emerson [10/Oct/2000:13:56:36-0700] "GET/eastwood.gif HTTP/1.0" 200 2980
0.0899                  ┌─302C        ─302B
127.0.0.3 -- eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif       ┌─302E                    ─302D
91.205.189.15 - - [28/Apr/2014:18:22:16] *GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159

┌─ 304
        ↓
docker: {
        container_id: f7360a148a670c4c257f4ee024be81284b6017d72ae41ea8ee5d
}                              ┌─304A
kubernetes: {
        container_name: kube-apiserver
        host: ip-172-20-43-173.ec2.internal
        labels: {
           k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal        ┌─304B
}
log: I0503 23:04:12.595203    1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}
```

┌─ 306

| time | ID | CPU | memory |
|---|---|---|---|
| 10/10/00 12:01:00.013 | eliza | 14% | 80% |
| 10/10/00 12:01:05.153 | eva | 26% | 70% |

*FIG. 3A*

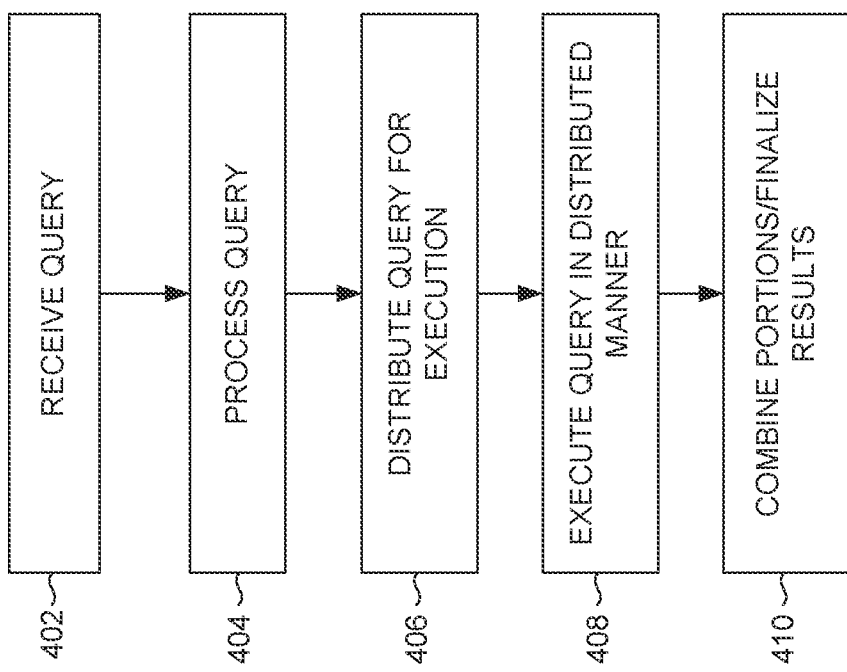

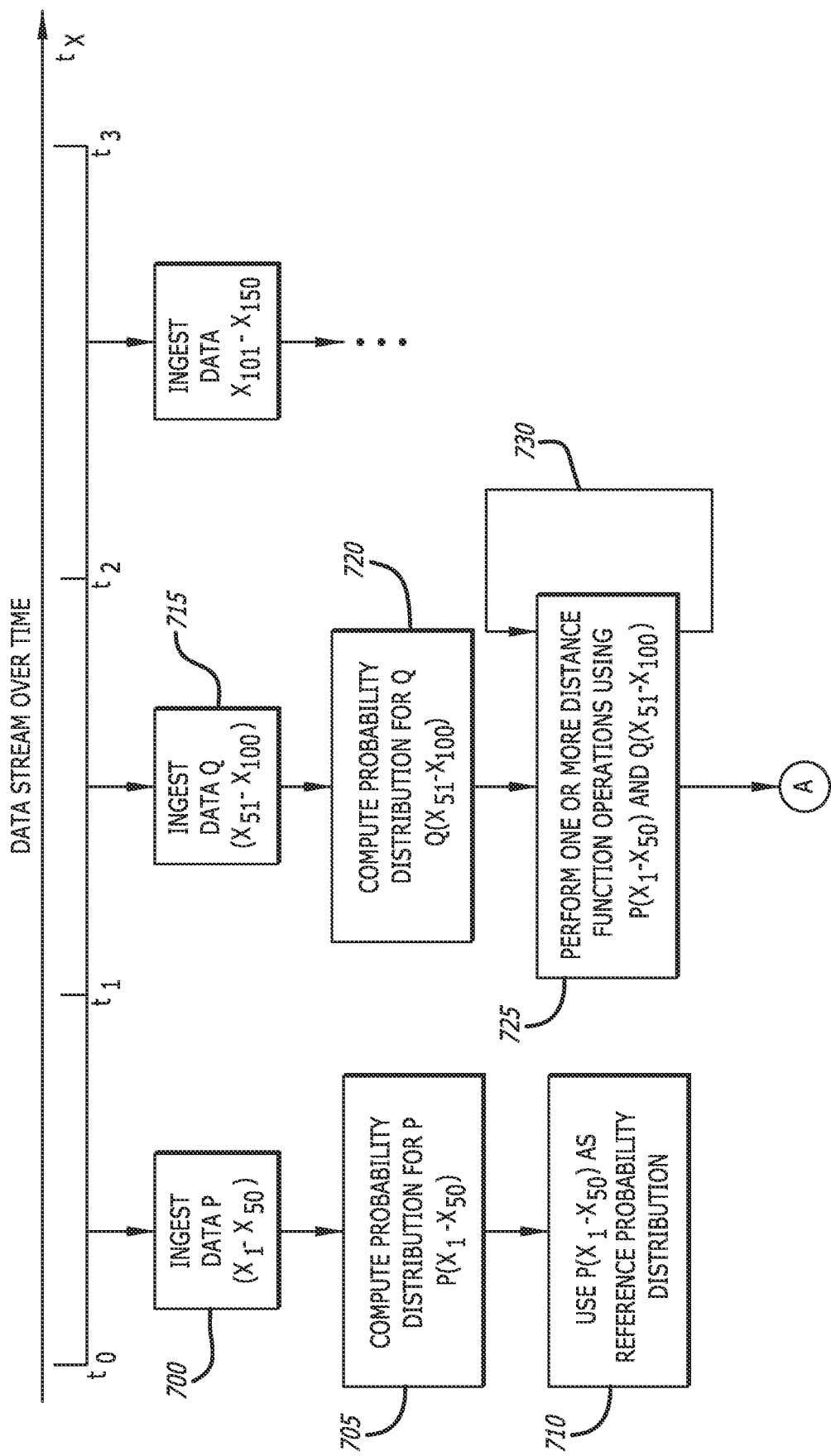

FIG. 18
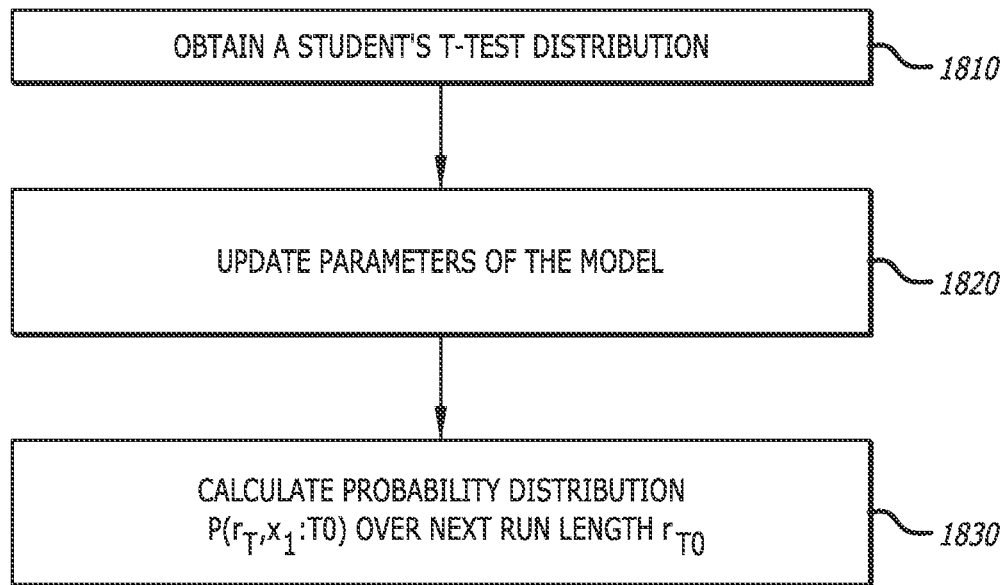
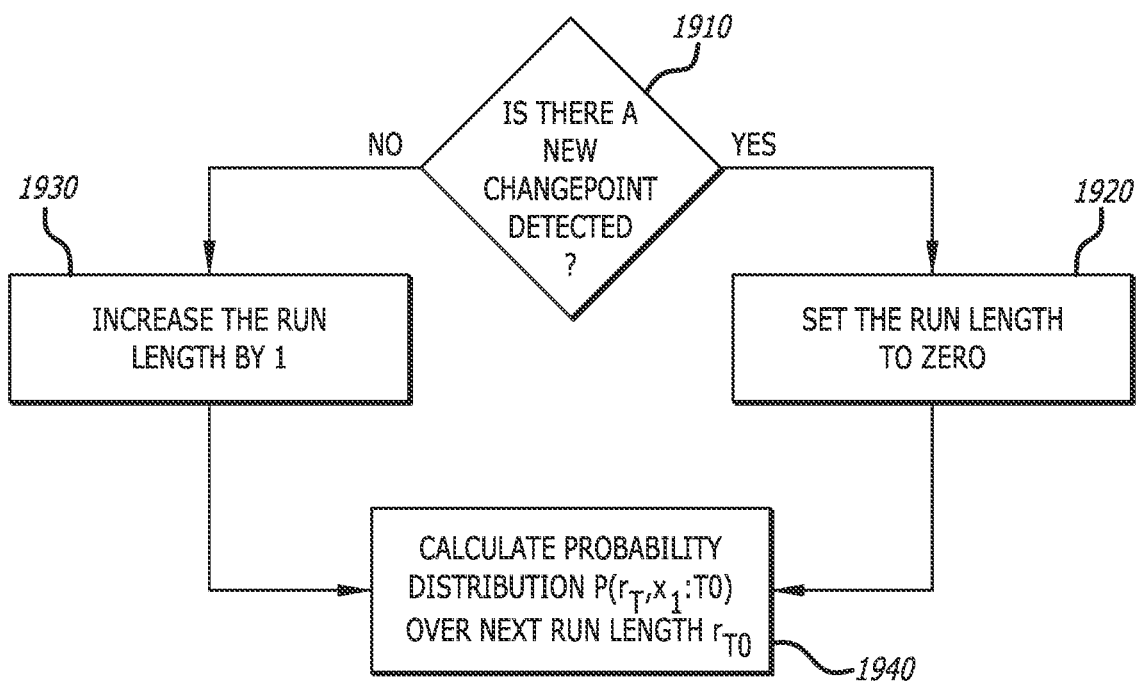
FIG. 19

SYSTEM AND METHOD FOR CATEGORICAL DRIFT DETECTION

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

Due to this increased dependency on data systems to store passively or actively generated data, it has become increasingly important to closely monitor the operability and health of deployed data systems. Currently, network administrators struggle with detection of data drift, namely an unexpected or unaccounted change to the content of incoming data, such as deviations from expected parameter values, data format, and/or other semantics. While data drift is not exclusively malicious in nature, as customers (e.g., users, including tenants providing finances to utilize the data system) may conduct system changes that modify the infrastructures associated with streaming data received for analytics, detection of data drift is crucial to detect and avoid potential data system failures caused by the incoming data, and in response, provide notification of the data drift and/or modify storage system operability to account for the data drift.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIG. 4A is a flow diagram illustrating an embodiment of a routine implemented by the query system to execute a query.

FIGS. 7A-7B are exemplary timeline representations illustrating the operations conducted by the categorical drift detection component of FIG. 5C to determine data drift.

FIG. 18 is a graphical representation and operational flow associated with the functionality of an embodiment of a drift detection method utilized by the model tuning component of FIG. 11C.

FIG. 19 is a graphical representation and operational flow associated with the functionality of an embodiment of a drift detection method utilized by the model tuning component of FIG. 11C.

DETAILED DESCRIPTION

Figure 3B:
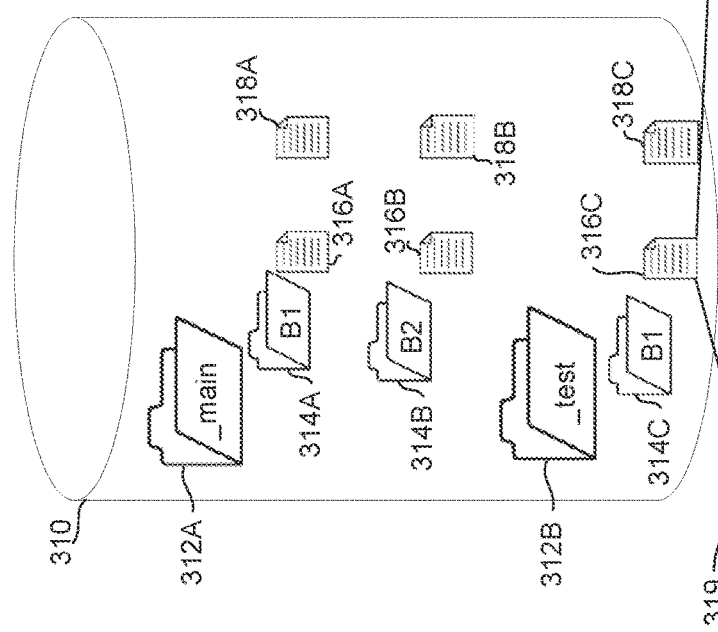
FIGS. 3B and 3C are block diagrams illustrating embodiments of various data structures for storing data processed by the data intake and query system.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data, although the bounding (restricting) of storage associated with data drift detection may assist in more reliably determining whether data drift is detected.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently (i.e. overlapping at least partially in time) report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The timestamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is configured as a laptop, the laptop can communicate with the web server to view a website.

1.1. Client Devices

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory storage medium, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

1.2. Host Devices

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory storage medium). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a standalone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data. Examples of functionality that enables monitoring performance of a host device are described in U.S. patent application Ser. No. 14/524,748, entitled "UTILIZING PACKET HEADERS TO MONITOR NETWORK TRAFFIC IN ASSOCIATION WITH A CLIENT DEVICE," filed on 27 Oct. 2014, and which is hereby incorporated by reference in its entirety for all purposes.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

1.4. Data Intake and Query System Overview

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four systems: 110, 112, 114, and 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory storage medium) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

1.4.1. Intake System Overview

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

1.4.3. Query System Overview

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

1.4.4. Storage System Overview

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

1.4.5. Other Components of the Data Intake and Query System

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, customer requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

1.4.6. On-Premise and Shared Computing Resource Environments

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or from multiple customers. Even in cases where a separate component of a system 102 is used for each customer, the underlying hardware on which the components of the system 102 are instantiated may still process data from different customers. Accordingly, in a shared computing resource environment, the data from different customers may not be physically separated on distinct hardware devices. For example, data from one customer may reside on the same hard drive as data from another customer or be processed by the same processor. In such cases, the system 102 can maintain logical separation between customer data. For example, the system 102 can include separate directories for different customers and apply different permissions and access controls to access the different directories or to process the data, etc.

In certain cases, data from different customers is mutually exclusive and/or independent from each other. For example, in certain cases, Customer A and Customer B do not share the same data, similar to the way in which data from a local hard drive of Customer A is mutually exclusive and independent of the data (and not considered part) of a local hard drive of Customer B. While Customer A and Customer B may have matching or identical data, each customer would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Customer A has a file that is identical to a file of Customer B, each customer would have a distinct and independent copy of the file stored in different locations on a data store or on different data stores.

Further, in certain cases, the system 102 can maintain the mutual exclusivity and/or independence between customer data even as the customer data is being processed, stored, and searched by the same underlying hardware. In certain cases, to maintain the mutual exclusivity and/or independence between the data of different customers, the system 102 can use identifiers to uniquely identify data associated with different customers.

In a shared computing resource environment, some components of the system 102 can be instantiated and designated for individual customers and other components can be shared by multiple customers. In certain embodiments, a separate intake system 110, indexing system 112, and query system 114 can be instantiated for each customer, whereas the shared storage system 116 or other components (e.g., data store, metadata catalog, and/or acceleration data store, described below) can be shared by multiple customers. In some such embodiments where components are shared by multiple customers, the components can maintain separate directories for the different customers to ensure their mutual exclusivity and/or independence from each other. Similarly, in some such embodiments, the system 102 can use different hosting computing systems or different isolated execution environments to process the data from the different customers as part of the intake system 110, indexing system 112, and/or query system 114.

In some embodiments, individual components of the intake system 110, indexing system 112, and/or query system 114 may be instantiated for each customer or shared by multiple customers. For example, some individual intake system components (e.g., forwarders, output ingestion buffer) may be instantiated and designated for individual customers, while other intake system components (e.g., a data retrieval subsystem, intake ingestion buffer, and/or streaming data processor), may be shared by multiple customers.

In certain embodiments, an indexing system 112 (or certain components thereof) can be instantiated and designated for a particular customer or shared by multiple customers. In some embodiments where a separate indexing system 112 is instantiated and designated for each customer, different resources can be reserved for different customers. For example, Customer A can be consistently allocated a minimum of four indexing nodes and Customer B can be consistently allocated a minimum of two indexing nodes. In some such embodiments, the four indexing nodes can be reserved for Customer A and the two indexing nodes can be reserved for Customer B, even if Customer A and Customer B are not using the reserved indexing nodes.

In embodiments where an indexing system 112 is shared by multiple customers, components of the indexing system 112 can be dynamically assigned to different customers. For example, if Customer A has greater indexing demands, additional indexing nodes can be instantiated or assigned to Customer A's data. However, as the demand decreases, the indexing nodes can be reassigned to a different customer, or terminated. Further, in some embodiments, a component of the indexing system 112 can concurrently process data from the different customers.

In some embodiments, one instance of query system 114 may be shared by multiple customers. In some such cases, the same search head can be used to process/execute queries for different customers and/or the same search nodes can be used to execute query for different customers. Further, in some such cases, different customers can be allocated different amounts of compute resources. For example, Customer A may be assigned more search heads or search nodes based on demand or based on a service level arrangement than another customer. However, once a search is completed the search head and/or nodes assigned to Customer A may be assigned to Customer B, deactivated, or their resource may be re-allocated to other components of the system 102, etc.

In some cases, by sharing more components with different customers, the functioning of the system 102 can be improved. For example, by sharing components across customers, the system 102 can improve resource utilization thereby reducing the amount of resources allocated as a whole. For example, if four indexing nodes, two search heads, and four search nodes are reserved for each customer then those compute resources are unavailable for use by other processes or customers, even if they go unused. In contrast, by sharing the indexing nodes, search heads, and search nodes with different customers and instantiating additional compute resources, the system 102 can use fewer resources overall while providing improved processing time for the customers that are using the compute resources. For example, if customer A is not using any search nodes and customer B has many searches running, the system 102 can use search nodes that would have been reserved for customer A to service customer B. In this way, the system 102 can decrease the number of compute resources used/reserved, while improving the search time for customer B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a timestamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
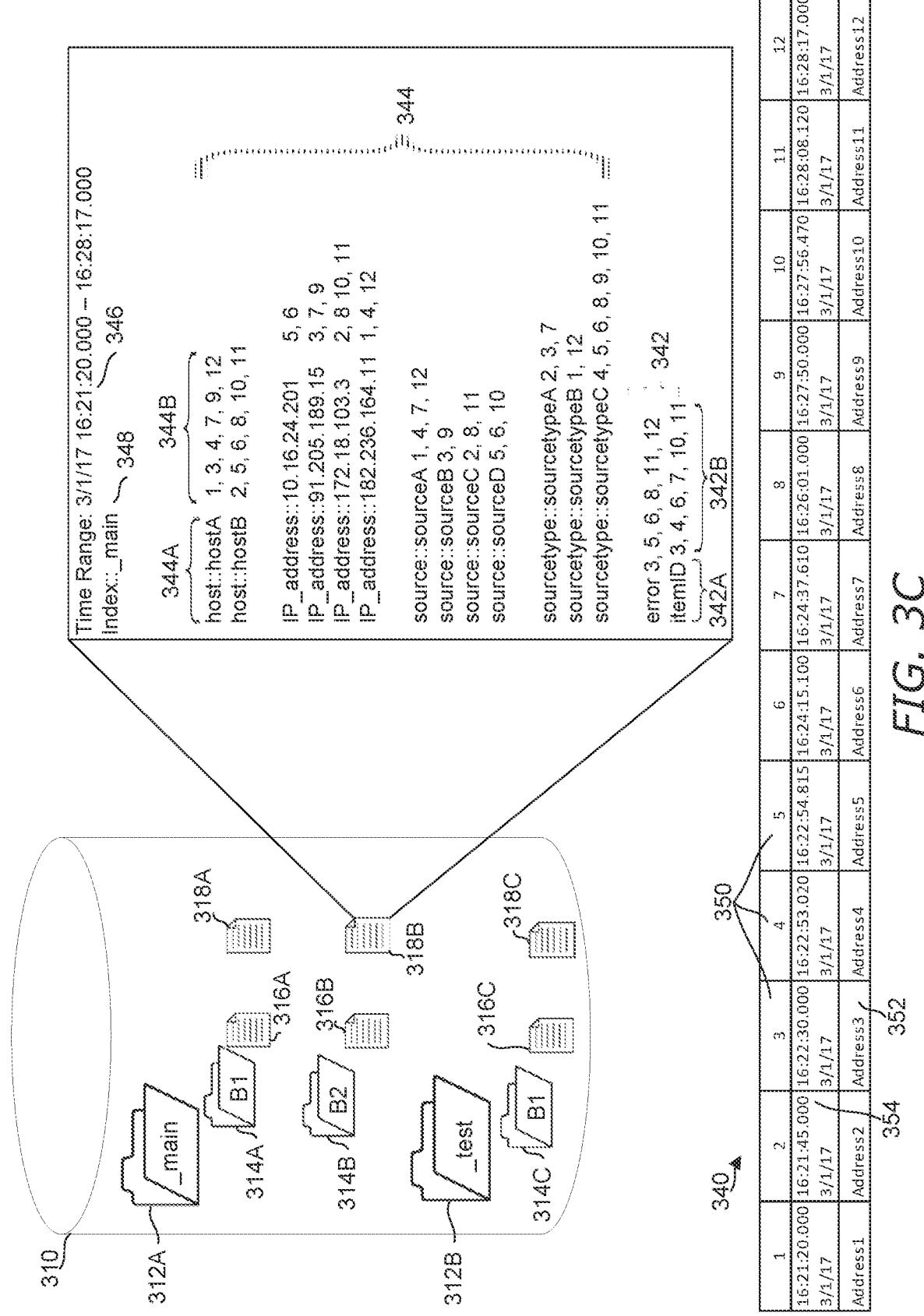

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

2.1. Machine Data and Data Storage Examples

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name:field values container_name:kube-apiserver, host:ip 172 20 43 173.ec2.internal, pod_id:0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or customer associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each customer and sub-directories for each index of each customer, or vice versa. Accordingly, the directories 312A and 312B can, in certain embodiments, correspond to sub-directories of a customer or include sub-directories for different customers.

In the illustrated embodiment of FIG. 3B, two sub-directories 314A, 314B of the _main directory 312A and one sub-directory 312C of the test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web access, and web service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries. U.S. Pub. No. 2018/0293304, incorporated herein by reference for all purposes, includes a non-limiting example of how the inverted indexes 318 can be used during a data categorization request command. Additional information is disclosed in U.S. Pat. No. 8,589,403, entitled "COMPRESSED JOURNALING IN EVENT TRACKING FILES FOR METADATA RECOVERY AND REPLICATION," issued on 19 Nov. 2013; U.S. Pat. No. 8,412,696, entitled "REAL TIME SEARCHING AND REPORTING," issued on 2 Apr. 2011; U.S. Pat. Nos. 8,589,375 and 8,589,432, both also entitled "REAL TIME SEARCHING AND REPORTING," both issued on 19 Nov. 2013; U.S. Pat. No. 8,682,925, entitled "DISTRIBUTED HIGH PERFORMANCE ANALYTICS STORE," issued on 25 Mar. 2014; U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY," issued on 8 Sep. 2015; and U.S. Pat. No. 9,990,386, entitled "GENERATING AND STORING SUMMARIZATION TABLES FOR SETS OF SEARCHABLE EVENTS," issued on 5 Jun. 2018; each of which is hereby incorporated by reference in its entirety for all purposes, also include additional information regarding the creation and use of different embodiments of inverted indexes, including, but not limited to keyword indexes, high performance indexes and analytics stores, etc.

3.0. Query Processing and Execution

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data that are part of the query to filter other data. For example, if an early part of the query includes instructions to obtain data with a particular field, but later commands of the query do not rely on the data with that particular field, the query system 114 can omit the superfluous part of the query from execution.

3.1. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g., calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
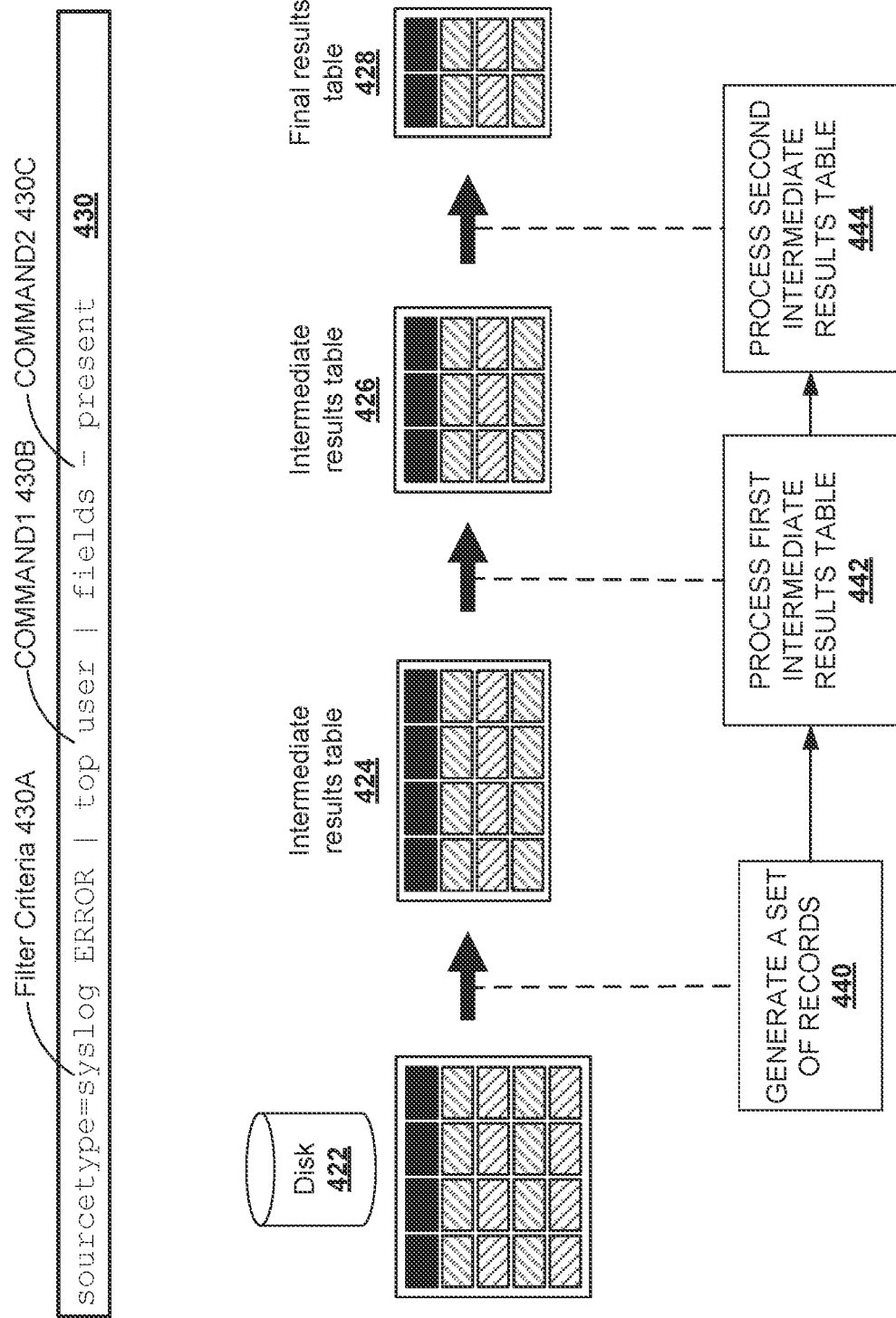
FIG. 4B provides a visual representation of the manner in which a pipelined command language or query can operate

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

3.2. Field Extraction

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
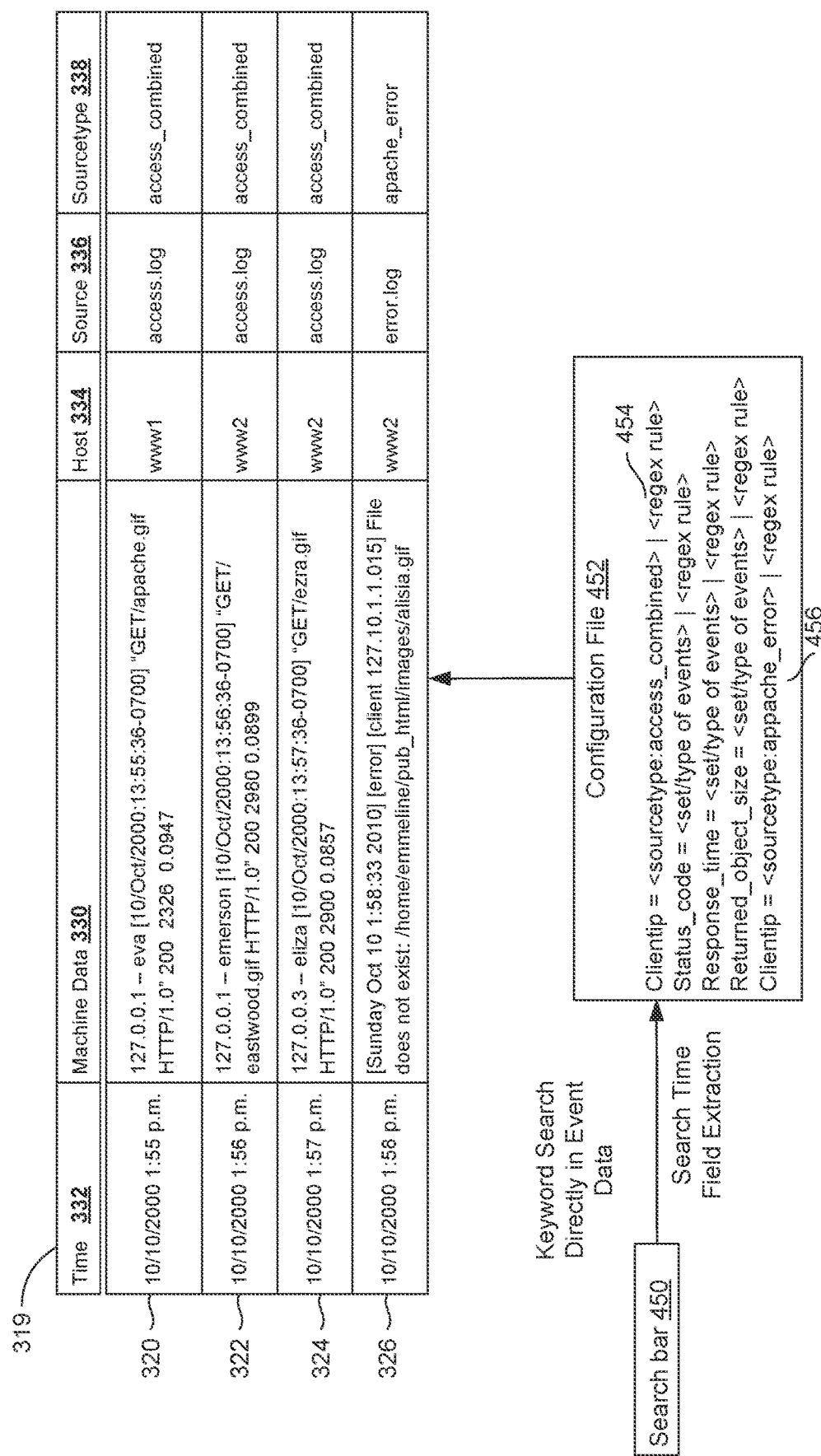
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression (regex) rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

For example, one or more field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve one or more extraction rules 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using the one or more extraction rules (hereinafter, "extraction rule(s)"). In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rule(s) in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

3.3. Data Models

The system 102 can use one or more data models to search and/or better understand data. A data model is a hierarchically structured search-time mapping of semantic knowledge about one or more data samples. It encodes the domain knowledge used to build a variety of specialized searches of those data samples. Those searches, in turn, can be used to generate reports. Additional information regarding data models, their creation and their use is described in U.S. Pat. Nos. 8,788,525 and 8,788,526, both entitled "DATA MODEL FOR MACHINE DATA FOR SEMANTIC SEARCH," both issued on 22 Jul. 2014; U.S. Pat. No. 8,983,994, entitled "GENERATION OF A DATA MODEL FOR SEARCHING MACHINE DATA," issued on 17 Mar. 2015; U.S. Pat. No. 9,128,980, entitled "GENERATION OF A DATA MODEL APPLIED TO QUERIES," issued on 8 Sep. 2015; U.S. Pat. No. 9,589,012, entitled "GENERATION OF A DATA MODEL APPLIED TO OBJECT QUERIES," issued on 7 Mar. 2017; each of which is hereby incorporated by reference in its entirety for all purposes. Building reports using a report generation interface is further explained in U.S. patent application Ser. No. 14/503,335, entitled "GENERATING REPORTS FROM UNSTRUCTURED DATA," filed on 30 Sep. 2014, and which is hereby incorporated by reference in its entirety for all purposes.

3.4. Acceleration Techniques

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports. Additional acceleration techniques are described in U.S. Pub. No. 2019/0354559, which is incorporated by reference herein for all purposes.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" |prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

4.1. Security Features

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

Additional information related to various security applications is described in U.S. application Ser. No. 16/512,899; U.S. Pat. No. 8,826,434, entitled "SECURITY THREAT DETECTION BASED ON INDICATIONS IN BIG DATA OF ACCESS TO NEWLY REGISTERED DOMAINS," issued on 2 Sep. 2014; U.S. Pat. No. 9,215,240, entitled "INVESTIGATIVE AND DYNAMIC DETECTION OF POTENTIAL SECURITY-THREAT INDICATORS FROM EVENTS IN BIG DATA," issued on 15 Dec. 2015; U.S. Pat. No. 9,173,801, entitled "GRAPHIC DISPLAY OF SECURITY THREATS BASED ON INDICATIONS OF ACCESS TO NEWLY REGISTERED DOMAINS," issued on 3 Nov. 2015; U.S. Pat. No. 9,248,068, entitled "SECURITY THREAT DETECTION OF NEWLY REGISTERED DOMAINS," issued on 2 Feb. 2016; U.S. Pat. No. 9,426,172, entitled "SECURITY THREAT DETECTION USING DOMAIN NAME ACCESSES," issued on 23 Aug. 2016; U.S. Pat. No. 9,432,396, entitled "SECURITY THREAT DETECTION USING DOMAIN NAME REGISTRATIONS," issued on 30 Aug. 2016; and U.S. App. Pub. No. 2013/0318236, entitled "KEY INDICATORS VIEW," filed on 31 Jul. 2013; each of which is hereby incorporated by reference in its entirety for all purposes.

4.3. IT Service Monitoring

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system is configured to store large volumes of minimally-processed service-related data at ingestion time for later retrieval and analysis at search time (sometimes referred to as "data ingestion volumes"), to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

Additional disclosure regarding IT Service Monitoring is described in U.S. application Ser. No. 16/512,899, incorporated by reference herein in its entirety.

4.4. Client or Customer Insights

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
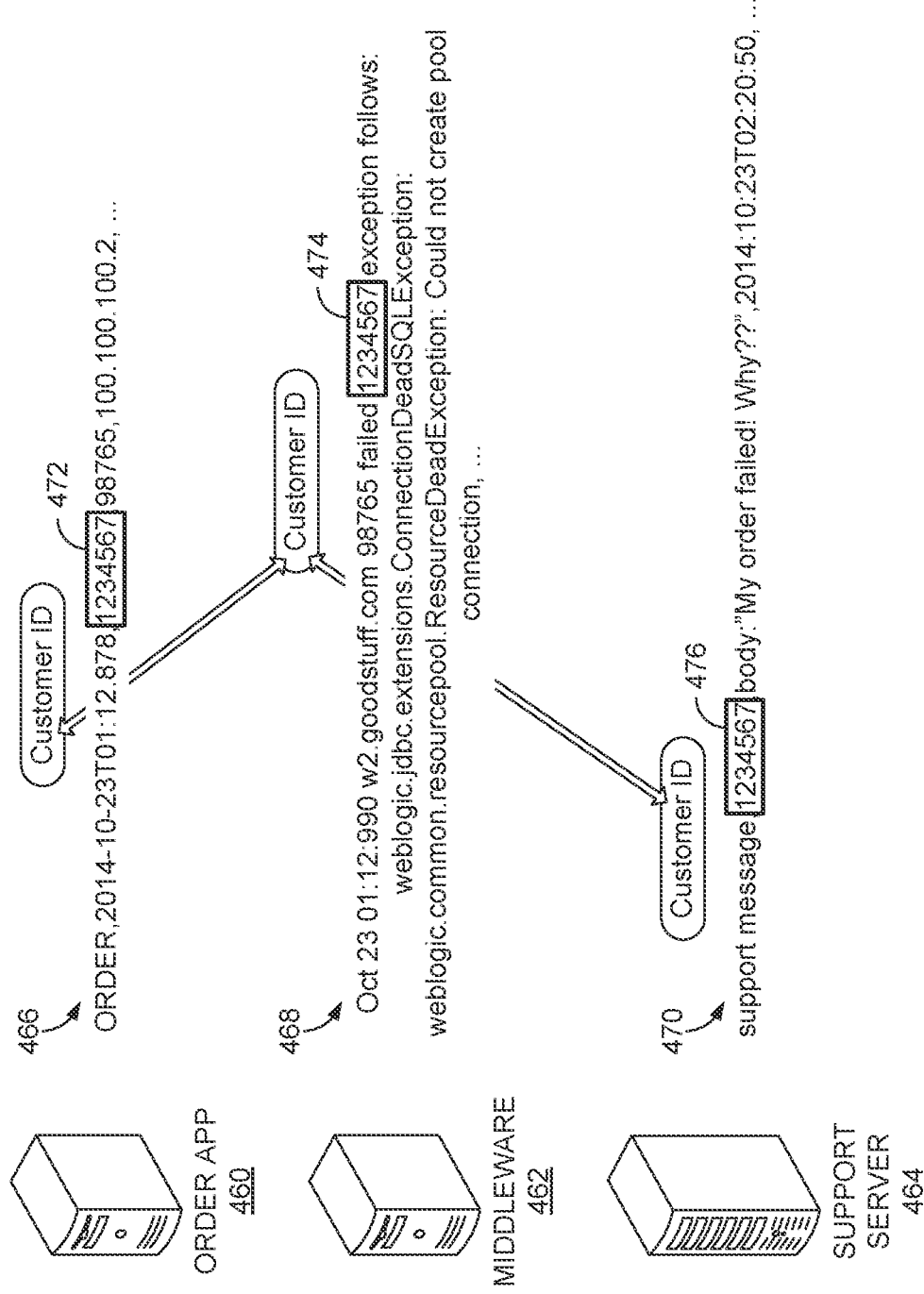
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rule(s) to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Architecture Specific Description

A. Summary

As discussed above, data processing environment may include and execute logic configured to detect and report data drift, where data drift may occur in value or format. This logic, referred to as a "drift detection subsystem," handles value drift detection differently based on data type, namely categorical data or continuous data. The categorical drift detection is described herein and illustrated in FIGS. 5A-8B. Continuous drift detection is further described herein and illustrated in FIGS. 11-19.

Herein, according to one embodiment of the disclosure, categorical drift corresponds to an unexpected change in value for a particular category of data, where the change may be identified by a level of divergence between value(s) for one or more data points of a data sample under analysis and corresponding value(s) for a data sample operating as a baseline (hereinafter, "reference sample"). Herein, a "data sample" may correspond to multiple data points, where each data point represents machine data that may be associated with a separate and distinct purpose from another data point. As an illustrative example of categorical drift, a change in transport type (from Transmission Control Protocol "TCP" to User Datagram Protocol "UDP") between data samples may constitute an occurrence of categorical value drift. Similarly, a change in another field associated with a data stream (e.g., field indicating a source location for an incoming data stream) may constitute a categorical value drift.

In contrast to value drift, format drift corresponds to a frequent or consistent change in format of a data point within a data sample. For example, a change in the format of a timestamp from a first format representation <date/hour/minute/second> to a second format representation <date/hour/minute/second/hundredth of second> may constitute format drift. As another example, a change in the format of a field, such as a change from a numeral representation to a character representation for example, may constitute an occurrence of format drift.

Besides being configured to detect data drift such as categorical (value) drift and format drift for example, the drift detection subsystem may be further configured to detect a byproduct of data drift, namely a format anomaly. Herein, "format anomaly" is related to format drift, but format anomalies involve an infrequent or inconsistent deviation in the format of a data point of a data sample from its expected format (e.g., occurrence less than 1% of time). Thus, this infrequent (or inconsistent) format deviation does not arise to a format drift condition, which is associated with a greater level of frequency (or consistency) in format deviation.

In summary, the drift detection subsystem is responsible for detecting and reporting data drift and format anomalies, inclusive of continuous data drift described below. Herein, the drift detection subsystem may be configured to detect categorical drift based, inter alia, on a degree of divergence between probability distributions pertaining the reference sample and each ingested data sample under analysis. Additionally, the drift detection subsystem may be configured to detect format drift based, inter alia, on a degree of divergence between probability distributions of a base format representation (e.g., baseline of count values associated with format representations for data points forming a representative data sample) and incoming data representations (e.g., count values associated with hashed format representations for data points of an ingested data sample under analysis). Also, the drift detection subsystem may be configured to detect format anomalies in which one or more fields associated with incoming data sample is altered, but the frequency of this alteration (deviation) fails to meet a prescribed threshold.

The drift detection subsystem may be configured to conduct data drift detection and/or format anomaly detection automatically. This automated process may be actuated to conduct analytics for data different detection and/or format anomaly detection on a periodic basis (e.g., temporal-based setting, etc.) or on an aperiodic basis (e.g., responsive to data ingestion). However, additionally or in the alternative, the drift detection subsystem may be actuated in response to query messages initiated by a customer to retrieve system operability including detected data drift conditions.

An overarching challenge for detecting and reporting data drift conditions has been changepoint detection for streaming data, where a "data drift condition" constitutes an unexpected change in data value and/or format within a data sample prior to indexing. According to one embodiment of the disclosure, by conducting drift detection on streaming data prior to indexing, errand data storage may be significantly reduced. This pre-indexing data drift detection may avoid inaccurate operability of (i) machine learning (ML) models associated with data intake and (ii) logic that relies on one or more rules (e.g., forwarder relying on extraction rules and/or technology add-ons (TAs)) to perform one or more selected tasks (e.g., parsing, formatting, etc.), where these rules rely on data streams having consistent formats in order to operate properly.

For categorical drift detection, the drift detection subsystem may be configured to conduct categorical drift detection operations concurrently with (i) tuning of system operability (e.g., window size, distribution size) that is responsible for generating outputs (e.g., estimated characteristic statistics, probability thresholds, metrics directed to detect deviation arising to categorical drift, etc.) for use in detecting data drift, and (ii) updating a population of data samples (hereinafter, "training data samples") from which at least a representative data sample is utilized for computing one or more estimated characteristic statistics relied upon to identify categorical drift of a data stream. The estimated characteristic statistics may include, but are not limited or restricted to (i) an estimated mean value, (ii) an estimated standard deviation, and/or (iii) an estimated variance of simulated data samples produced by a bootstrap process. For example, an estimated mean value represents a mean value for the training data samples and operates as an error threshold in determining whether a degree of divergence of probability distributions pertaining to an ingested data sample and a reference sample. The degree of divergence in comparison with the estimated mean value (d_hat1) identifies whether the data stream is experiencing categorical drift. If so, an alert message is generated and provided to the customer.

Similarly, for format drift detection, the drift detection subsystem may be configured to conduct format drift detection operations concurrently with (i) tuning of the system operability, and (ii) updating training data samples from which one or more representative data samples are utilized for computing count values pertaining to format representations associated with targeted data points of the representative data sample(s). For example, for a timestamp for example, a format representation change may constitute an alteration in data structure for a data point within a field of a data sample from a first representation <month/day/year> to a second representation <day/month/year>. The format representation may correspond to a hash value, and thus, a change in format causes a change in the hash value.

For format anomaly detection, the drift detection subsystem extracts format representation of a data point for a particular input field within a data sample. The format representation may be transformed to a unique value (e.g., undergoes a one-way hash function to generate a hash value) that alters a count value associated with a counter dedicated to that particular format representation. The count values are evaluated by an information decay function to determine the frequency or infrequency of a format representation change, where infrequent format representation changes denote a format anomaly.

As described below, according to one embodiment of the disclosure, data drift and format anomaly detection may be conducted by a categorical (value) drift detection component, a format drift detection component and a format anomaly detection component, as described below. Therefore, the drift detection subsystem may be configured to conduct pre-indexing data drift detection by conducting analytics on data samples being part of streaming data at ingestion and/or during processing by the forwarder. Additionally, or in the alternative, the drift detection subsystem may be configured to conduct pre-indexing format anomaly detection.

B. Data Processing Environment

Figure 5A:
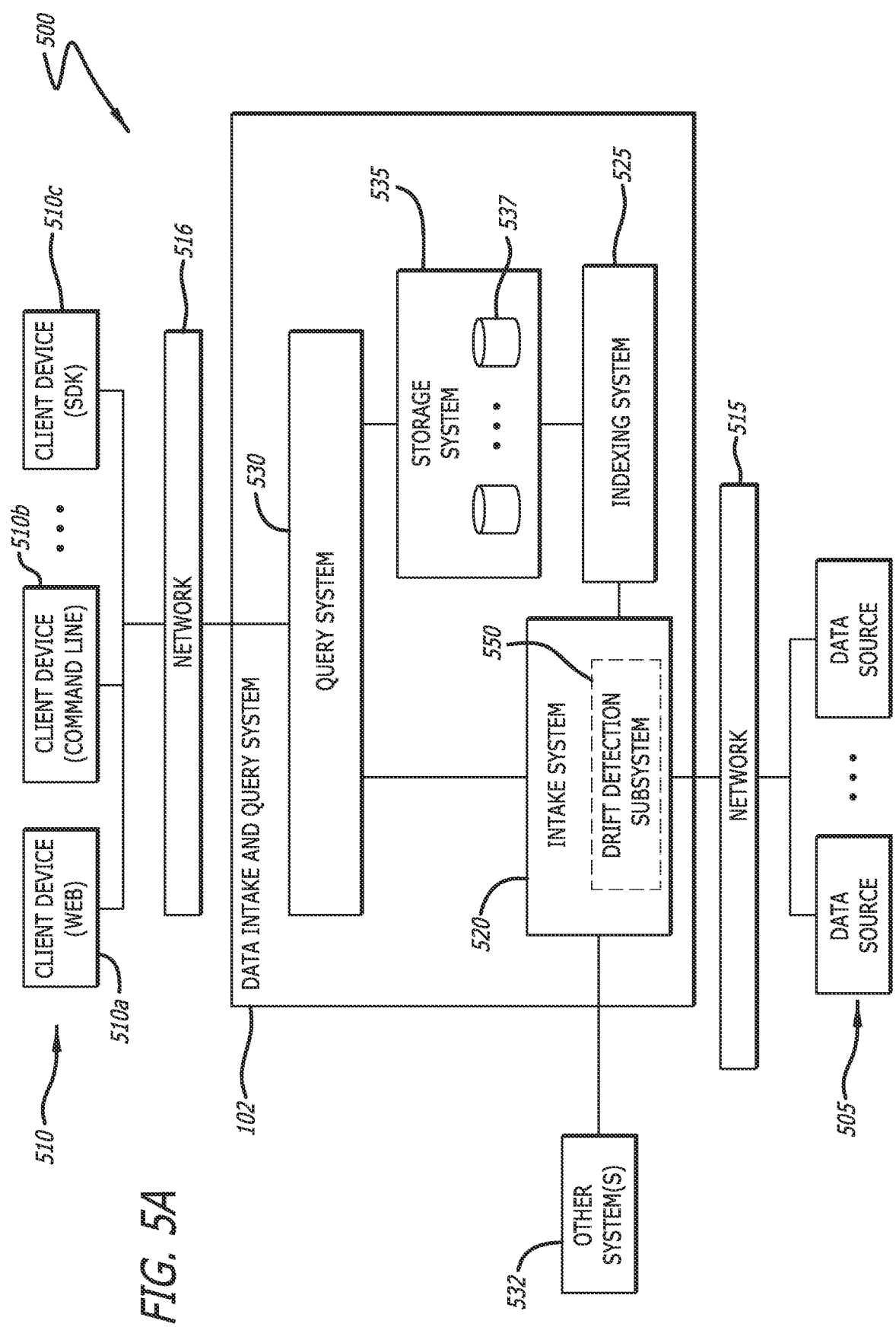
FIG. 5A is a block diagram illustrating an embodiment of a data processing environment including a drift detection subsystem.

Referring to FIG. 5A, a block diagram illustrating an embodiment of a data processing environment 500 including a drift detection subsystem 550 is shown. The data processing environment 500 features one or more data sources 505 (generically referred to as "data source(s)") and client devices 510a, 510b, 510c (generically referred to as "client device(s) 510") in communication with the data intake and query system 102 via networks 515 and 516, respectively. The networks 515 & 516 may correspond to portions the same network or may correspond to different networks. Further, the networks 515 & 516 may be implemented as private and/or public networks, one or more LANs, WANs, Bluetooth™, cellular networks, intranetworks, and/or internetworks using any of wired, wireless, terrestrial microwave, satellite links, etc., and may include the Internet.

Each data source 505 broadly represents a distinct source of data that can be consumed by the data intake and query system 102. The data source(s) 505 may be positioned within the same geographic area or within different geographic areas such as different regions of a public cloud network. Examples of a data source 505 may include, without limitation or restriction, components or services that provide data files, directories of files, data sent over a network, event logs, registries, streaming data, etc. Herein, according to one embodiment of the disclosure, the data source(s) 505 provide streaming data (also referred to as a "data stream") to an intake system 520 via the network 515, where the data stream may be processed by the drift detection subsystem 550. According to one embodiment of the disclosure, the receipt of the data stream by the intake system 520 may actuate operations of the drift detection subsystem 550 to conduct data drift analytics, including performing operation directed to detecting value drift, format drift, and/or a format anomaly.

The client device(s) 510 can be implemented using one or more computing devices in communication with the data intake and query system 102, and represent some of the different ways in which computing devices can submit queries to the data intake and query system 102. For example, a first client device 510a may be configured to communicate with the data intake and query system 102 over the network 516 via an Internet (Web) portal. In contrast, a second client device 510b may be configured to communicate with the data intake and query system 102 via a command line interface while a third client device 510c may be configured to communicate with the data intake and query system 102 via a software developer kit (SDK). As illustrated, the client device(s) 510 can communicate with and submit queries to the data intake and query system 102 in accordance with a plurality of different communication schemes. Sometimes, the queries can be used to actuate operations of the drift detection subsystem 550 as well.

The data intake and query system 102 can process and store data received from the data source(s) 505 and execute queries on the data in response to requests received from the client device(s) 510, perhaps requests as to detecting data drift. In the illustrated embodiment, the data intake and query system 102 includes the intake system 520, an indexing system 525, a query system 530, and/or a storage system 535 including one or more data stores 537. The data intake and query system 102 may include systems, subsystems, and components, other than the systems 520/525/530/535 described herein. Some of these other systems, subsystems and components are described in U.S. Patent Publication No. 2021/0117857, the entire contents of which are incorporated by reference herein.

As mentioned, the data intake and query system 102 may be configured to receive or subsequently consume (ingest) data from different sources 505. In some cases, the data sources 505 can be associated with different customers. Further, each customer may be associated with one or more indexes, hosts, sources, sourcetypes, or users. The data intake and query system 102 can concurrently receive and process the data from multiple customers, particularly systems and sources owned or controlled by these customers. In certain cases, although the data from different customers can be processed together or concurrently, the data intake and query system 102 can take steps to avoid combining or co-mingling data from the different customers. For example, the data intake and query system 102 can assign an identifier for each customer and maintain separation between ingested data using the customer identifier. In some cases, the identifier can be assigned to the data at the data sources 505, or can be assigned to the data by the data intake and query system 102 at time of ingestion.

Figure 5B:
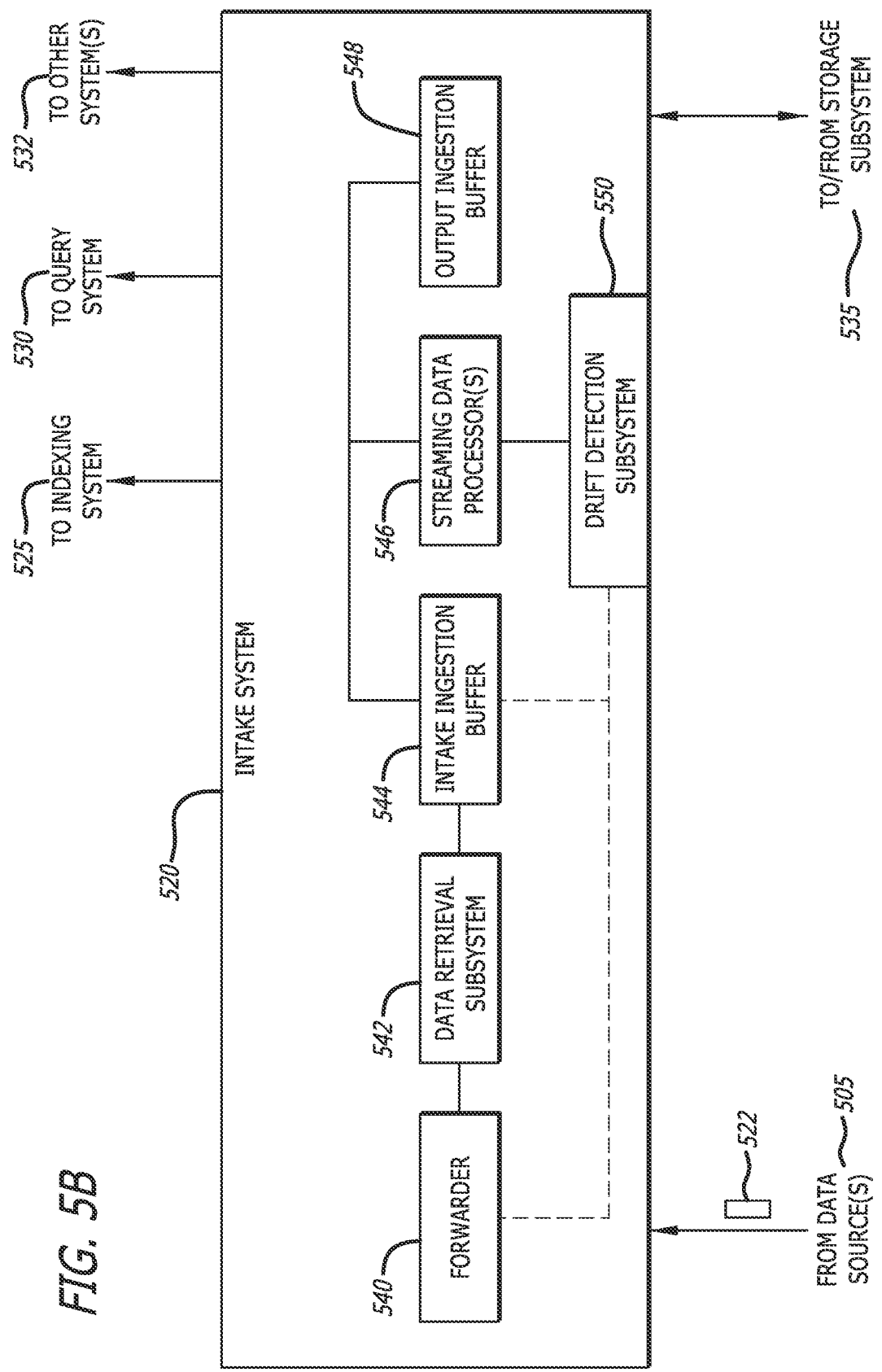
FIG. 5B is a block diagram illustrating an embodiment of the operational flow of information between subsystems within the intake system of the data intake and query system of FIG. 1, including the drift detection subsystem of FIG. 5A.

As will be described in greater detail herein, as illustrated in FIG. 5B, the intake system 520 may be configured to (i) receive data from the data source(s) 505, (ii) perform one or more preliminary processing operations on the data, and/or (iii) communicate the data to the indexing system 525, the query system 530, or other systems 532 (which may include, for example, data processing systems, telemetry systems, real-time analytics systems, data stores, databases, etc., any of which may be operated by an operator of the data intake and query system 102 or a third party).

In particular, the intake system 520 may be configured to receive data 522 from the data source(s) 505 in a variety of formats or structures. In some embodiments, the received data 522 may correspond to streaming data as raw machine data, structured or unstructured data, correlation data, data files, directories of files, data sent over a network, event logs, sensor data, image and/or video data, etc. The intake system 520 can process the data 522 based on the form in which it is received. In some cases, the intake system 520 can utilize one or more rules to process the data 522 and to make the processed data available to downstream systems (e.g., the indexing system 525, query system 530, etc.).

Illustratively, the intake system 520 can enrich the received data 522. For example, the intake system 520 may add one or more fields to the data 522 received from the data sources 505, such as fields denoting the host, source, sourcetype, index, or customer associated with the incoming data. In certain embodiments, the intake system 520 can perform additional processing on the data 522, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc. As described herein, the intake system 520 can perform data drift detection and reporting of detected data drift conditions, such as the value drift or format drift for example, as well as detected format anomalies as described below.

The intake system 520 features one or more streaming data processors 546 for processing, where the streaming data processor(s) 546 can be configured in operate in accordance with one or more rules to transform data, and republish the data to one or both of an intake ingestion buffer 544 and an output ingestion buffer 548. In particular, the intake system 520 can function to conduct preliminary processing of data ingested at the data intake and query system 102. As such, the intake system 520 illustratively includes a forwarder 540 that obtains data from one of the data source(s) 505, parses the data in accordance with one or more rules (e.g., data extraction rule(s), TA(s), etc.), and transmits the data to a data retrieval subsystem 542. The data retrieval subsystem 542 may be configured to convert or otherwise format data provided by the forwarder 540 into an appropriate format for inclusion at an intake ingestion buffer 544 and transmit the data to the intake ingestion buffer 544 for further processing.

Thereafter, the streaming data processor(s) 546 may obtain data from the intake ingestion buffer 544, process the data, and republish the data to either the intake ingestion buffer 544 (e.g., for additional processing) or to the output ingestion buffer 548, such that the data is made available to downstream components or systems such as the indexing system 525, query system 530 or other systems 532. In this manner, the intake system 520 may repeatedly or iteratively process data according to one or more rules, such as extraction rules (e.g., regex rules that may involve parsing) for example, where the data is formatted for use on the data intake and query system 102 or any other system. As discussed below, the intake system 520 may be configured to conduct such processing rapidly (e.g., in "real-time" with little or no perceptible delay), while ensuring resiliency of the data.

Additionally, as shown in FIG. 5B, the drift detection subsystem 550 is configured to operate in concert with the streaming data processor(s) 546 to analyze ingested data to detect whether a data drift condition is occurring (or has occurred). More specifically, the drift detection subsystem 550 is responsible for detecting and reporting data drift conditions and format anomalies. For example, the drift detection subsystem 550 may be configured to detect categorical drift based, inter alia, on a degree of divergence between probability distributions pertaining to a reference sample operating as a baseline and ingested data samples when under analysis.

In particular, the drift detection subsystem 550 features logic that operates in accordance with one or more ML models to compute probability distributions of ingested data, namely one or more data samples and a reference (base) sample. More specifically, both an incoming data sample and the reference sample may be parsed or extracted from an ingested data stream. A first ML model operating within the drift detection subsystem 550 may be configured to generate probability distributions associated with the reference sample (P(x)) and the data sample (Q(x)). According to one illustrative embodiment, each probability distributions (P(x), Q(x)) may correspond to f(x) set forth in equation 1 below:

$$f(x) = \frac{1}{\sigma\sqrt{2\pi}} e^{-\frac{(x-\mu)^2}{2\sigma^2}} \quad \text{equation (1)}$$

Where f(x) equals the probability distribution, x equals the value of the variable, μ equals the mean, a equals the standard deviation, and G 2 equals the variance.

Figure 6:
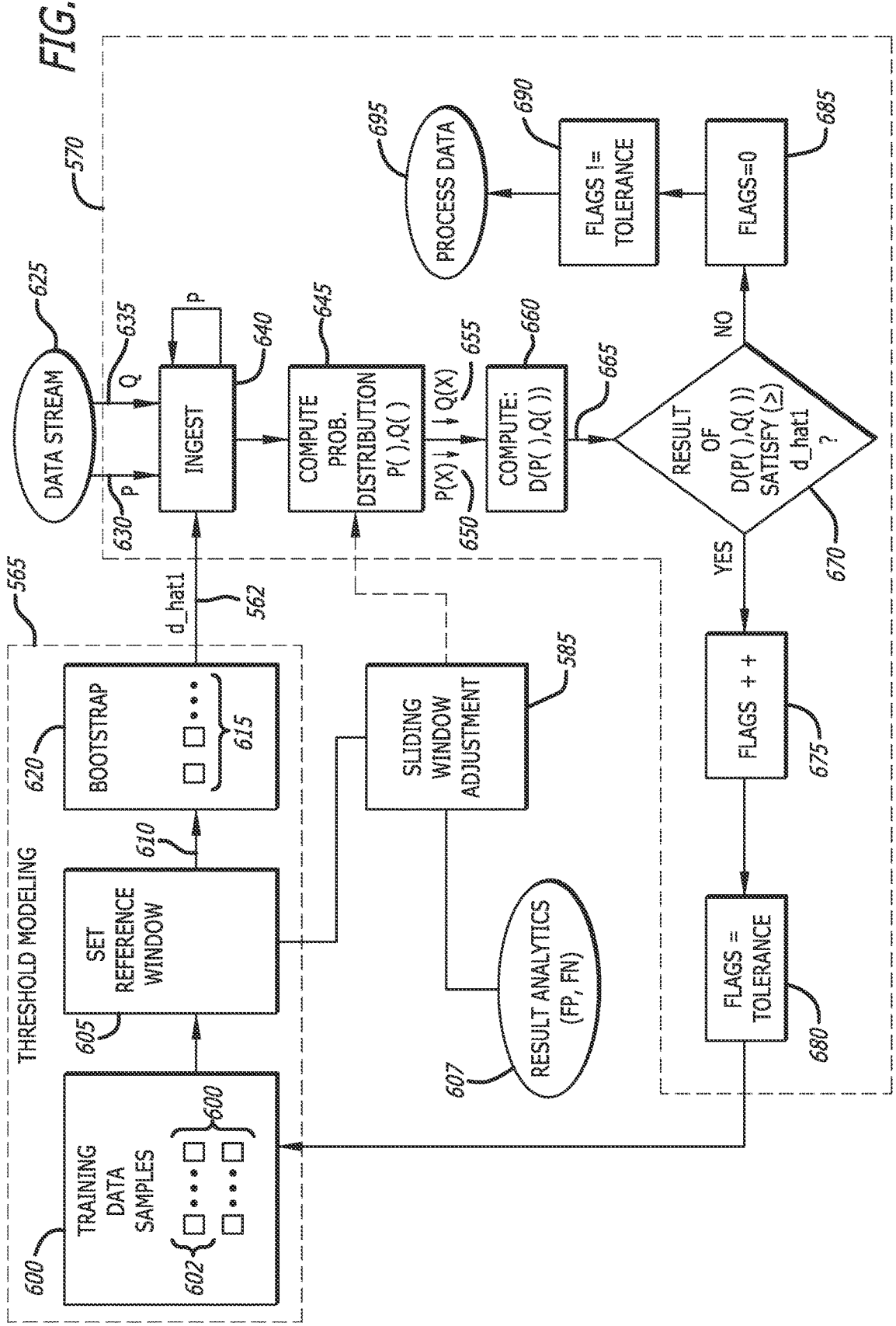
FIG. 6 is a block diagram illustrating an embodiment of the operations conducted by the categorical drift detection component of FIG. 5C to determine data drift.

Thereafter, the probability distributions (P(x), Q(x)) may be loaded into a non-parametric distance function, which generates a distance result. A "distance result" constitutes one or more non-negative, real values representing differences or similarities between the probability distributions P(x) and Q(x). For example, the distance result may include characteristic statistics (e.g., mean, variance, etc.) pertaining to an "average" of the probability distributions (P(x), Q(x)), where these values can be used in detecting categorical drift as illustrated in FIG. 6.

Additionally, the drift detection subsystem 550 may be configured to detect format drift based, inter alia, on a degree of divergence between probability distributions of a base format representation (e.g., baseline of count values associated with format representations for data points forming a representative data sample) and format representations (e.g., count values associated with hashed format representations associated with data to be ingested).

Also, the drift detection subsystem may be configured to detect format anomalies in which format representations of data points within input fields of the data sample have been altered. Through analysis of the frequency of the alteration(s) to occur under or within a prescribed threshold, the format representation change is construed as a format anomaly in lieu of a format drift condition.

Figure 5C:
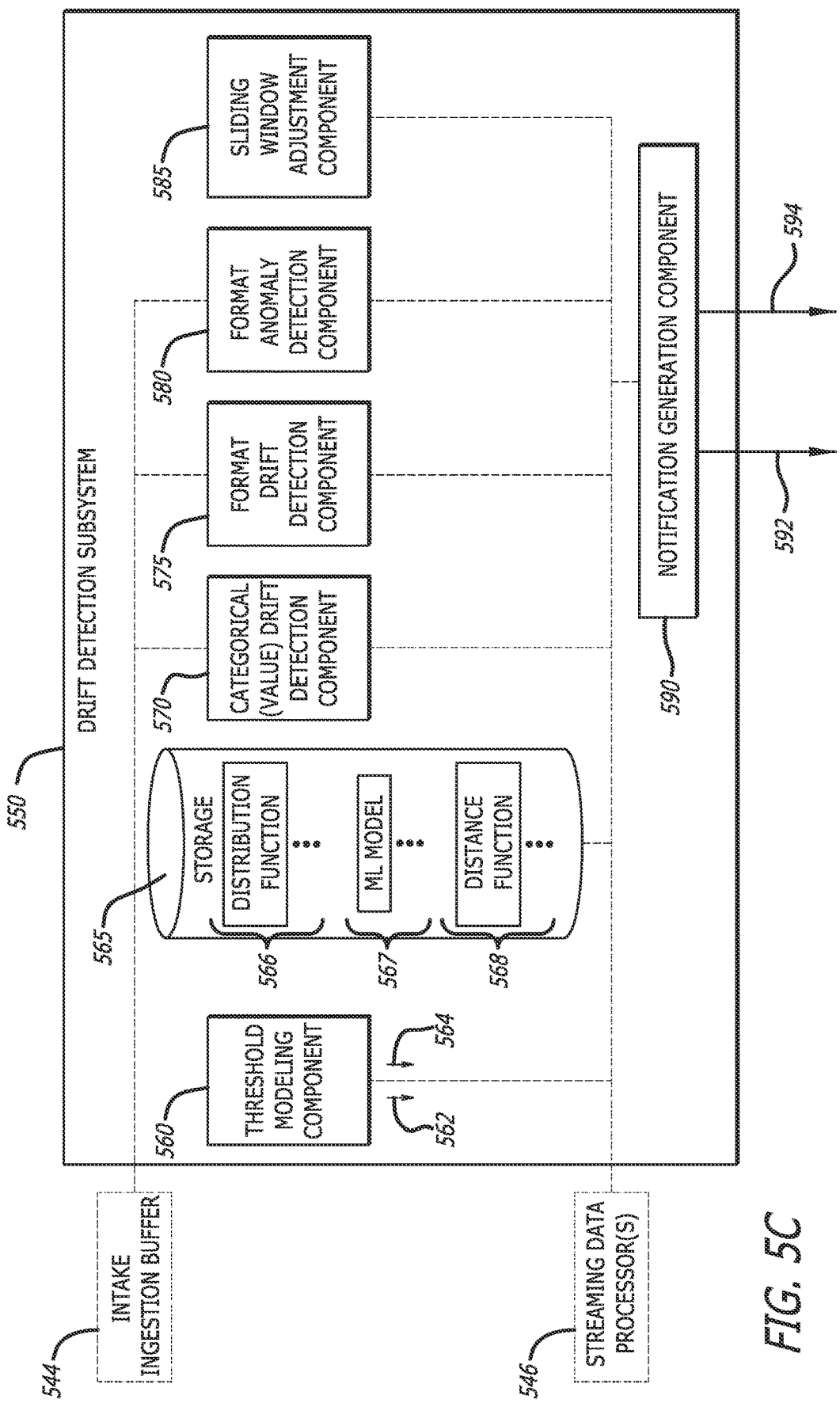
FIG. 5C is a block diagram illustrating an embodiment of the components forming the drift detection subsystem operating with the streaming data processor(s) deployed within the intake system of FIG. 5B.

Referring now to FIG. 5C, a block diagram illustrating an embodiment of components forming the drift detection subsystem 550, which is operating with the streaming data processor(s) 546, deployed within the intake system 520 of FIG. 5B, is shown. The drift detection subsystem 550 includes a threshold modeling component 560, data storage 565 (or access thereto), categorical drift detection component 570, a format drift detection component 575, a format anomaly detection component 580, a sliding window adjustment component 585, and a notification generation component 590.

According to this embodiment of the disclosure, one or more probability distribution functions 566, one or more machine-learning (ML) models 567, and/or one or more distance functions 568 may be maintained in the data storage 565, operating as local storage or cloud-based storage. According to one embodiment of the disclosure, the categorical drift detection component 570 and the format drift detection component 575 may be configured to utilize the same ML model(s) 567 to generate probability distributions (P(x), Q(x)) associated with the reference data and the ingested data, as described below. However, the categorical drift detection component 570 and the format drift detection component 575 rely on different distance function(s) 568, as described below.

Herein, threshold modeling component 560 is configured to generate characteristic statistics 562 (referred to as "d_hat1"), which represent sample statistics utilized by the categorical (value) drift detection component 570 for identifying whether an ingested data sample under analysis may be experiencing categorical drift. As an illustrative example, the sample statistics d_hat1 562 may constitute an estimated bootstrap mean value that is generated from averaged mean values of simulated samples and represents a mean value of training data samples, as illustrated in FIG. 6. Additionally, the threshold modeling component 560 is configured to generate statistics 564 (referred to as "d_hat2"), which represent one or more count values associated with format representation changes within one or more representative data samples extracted from the training data samples.

As further shown in FIG. 5C, the categorical drift detection component 570 is configured to detect a categorical drift condition occurring for an ingested data stream. According to one embodiment of the disclosure, communicatively coupled to the intake ingestion buffer 544 as shown in FIG. 5B, the categorical drift detection component 570 computes (i) a probability distribution P(x) for a reference sample operating as a baseline and (ii) a probability distribution Q(x) for the data sample under analysis. Based on a comparison between (1) the distance result, representative of the divergence of the probability distributions (P(x), Q(x)), and (2) the sample statistics d_hat1 562 provided from the threshold modeling component, the categorical drift detection component 570 is able to detect a categorical drift condition.

Upon detecting the categorical drift condition, the categorical drift detection component 570 is configured to determine (i) whether data sample updates are needed by the threshold modeling component 560, (ii) whether the current data sample under analysis is to be now utilized as the reference sample, and/or (iii) whether an alert message 592 to the customer is to be issued via a notification generation component 590.

The format drift detection component 575 is configured to detect a format drift condition occurring for an ingested data stream based on a change in format. According to one embodiment of the disclosure, also communicatively coupled to the intake ingestion buffer 544 of FIG. 5B, the format drift detection component 575 computes probability distributions for (i) a first set of hashed format representations operating as a baseline and (ii) a second set of hashed format representations associated with a data sample within a data stream under analysis. Herein, a hash operation is conducted to differentiate different format representations directed to the same input field (e.g., data point types).

Figure 9:
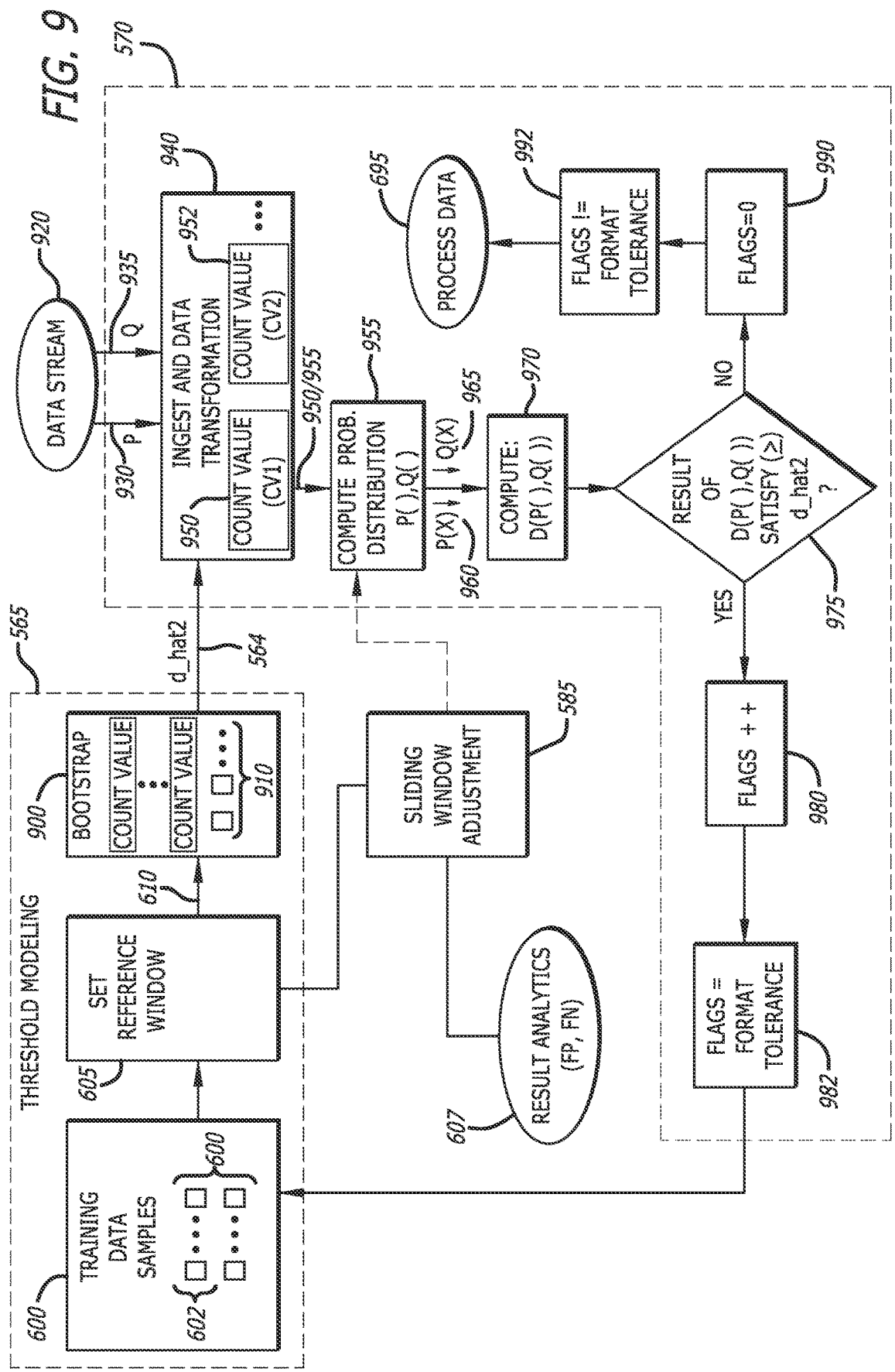
FIG. 9 is a block diagram illustrating an embodiment of the operations conducted by the format drift detection component of FIG. 5C to detect format drift.

Based on the divergence of these probability distributions in comparison with the statistics d_hat2 564 associated with collected format representations evidencing format drift, the format drift detection component is able to detect if a format drift condition has occurred. Upon detection of a format drift condition, the format drift detection component 575 is configured to determine (i) whether an update of the format representation samples updates is needed, (ii) whether format representation under analysis (or a version thereof) is to be now utilized as the reference format representation, and/or (iii) whether an alert 594 to the customer is to be issued via the notification generation component 590, as illustrated in FIG. 9 and described below.

The format anomaly detection component 580 is configured to conduct analytics of format representations of input fields within incoming data samples to detect a format anomaly. More specifically, the format anomaly detection component 580 is configured to parse or extract format representations from input fields within each incoming data sample similar to the operations conducted by the format drift detection component 575. The input fields pertain to data points of incoming data samples received via the intake ingestion buffer 544. Each of the format representations may undergo a one-way hash operation or other data transformation scheme to generate a unique value representative of the format representation (e.g., hash value). In the event of a change in the format representation, where the frequency of the format representation change for a particular data point is uncommon or infrequent (e.g., format change in less than a prescribed threshold such as a percentage (1%) of received data points or less than a prescribed number of format changes), the format representation is construed as a format anomaly. After detection, the format anomaly is reported as an alert message 594 to the customer via the notification generation component 590.

The sliding window adjustment component 585 may be configured to alter a reference window for selection of data samples utilized by the threshold modeling component 560 to determine d_hat1 592 and/or d_hat2 594, which are utilized by the categorical drift detection component 570 and the format drift detection component 575 to detect data drift conditions as described above. Also, the sliding window adjustment component 585 may be further configured to adjust distribution sizing of data points associated with the reference sample and current data sample in the generation of the probability distributions (P(x), Q(x)) used by the categorical drift detection component 570 and format drift detection component 575.

6.0. Categorical Data Drift Operability

A. Operational Summary

As an overview, for categorical drift detection, a bootstrap process 620 (operating within the training modeling component 560 of FIG. 5C) receives one or more representative data samples 610 extracted (using the reference window 605) from the training data samples 600 (i.e. population data samples). Each training data sample 600 may include multiple data points, each data point at least corresponding to an input field. Each data point, namely content within an input field, includes data along with schema to identify the type of data (hereinafter, "data schema"). From the representative data sample(s) 610, the bootstrap process 620 may be configured to conduct a sampling operation by extracting data and data schema from selected fields within the representative data sample(s) 610 to generate simulated samples 615 from the representative data sample(s) 610.

Based on these simulated samples 615, characteristic statistics d_hat1 562 may be determined for each input field type. For example, characteristic statistics may be determined for timestamps maintained with timestamp fields, characteristic statistics may be determined for port numbers within port fields, or the like. As an illustrative example, the characteristic statistics for each input field of the representative data sample(s) 610, d_hat1 562, may correspond to a bootstrap mean value for that input field, which is generated from the averaged mean values of data from similar input fields of the simulated samples 615 and represents a mean value of the training data samples 600.

With respect categorical drift operations, a probability distribution (P(x)) is generated from a reference sample operating as a baseline (e.g., first data sample featuring data points $X_1$-$X_{50}$). Thereafter, for an ingested data sample ($X_{51}$-$X_{100}$), we conduct a probability distribution (Q(x)) and both probability distributions of the reference sample and the ingested data sample (P(x), Q(x)) are loaded into a distance function (D). The distance function is configured to determine a degree of divergence for a particular data point type (e.g., a first distance function may be adapted to consider data drift associated with a timestamp with a second distance function being adapted to consider data drift associated with port numbers, etc.). If the degree of divergence fails to satisfy d_hat1 562 (e.g., greater than or equal to d_hat1 562), categorical drift is detected.

B. Categorical Drift Detection Operational Flow

Referring now to FIG. 6, a block diagram illustrating an embodiment of categorical drift detection processes is shown, as conducted by the categorical drift detection component 570 in combination with the threshold modeling component 565 and the sliding window adjustment component 585 of FIG. 5C. According to this embodiment of the disclosure, as described above, the threshold modeling component 560 maintains or is provided access to a data store including training data samples 600. The training data samples 600 are data samples organized from the same data source and/or same schema. Hence, where an incoming data stream is from a first data source, a first set of training data samples 602 are associated with the first source are referenced.

More specifically, the reference window 605 is sized to collect a representation of data samples 610 from the first set of training data samples 602. A sizing of the reference window 605 may be based on customer feedback such as performance metrics 607 (e.g., number of issued alert messages that constituted false positives and false negatives). The reference window 605 may be increased based on the performance metrics 607, where the reference window 605 may be increased/decreased in response to a number of false positives exceeding/falling below a reporting threshold. The representation of data samples 610 may collectively correspond to data samples from a source of a data stream 625 ingested for analysis.

From the representative data sample(s) 610, the bootstrap process 620 may be configured to conduct a sampling operation by extracting data and data schema from a subset of input fields within the representative data sample(s) 610 to generate simulated samples 615 from the representative data sample(s) 610. From the simulated samples 615, the bootstrap process 620 may generate characteristic statistics d_hat1 562 for each input field of the simulated samples 615 as selected by the customer. For example, characteristic statistics may be determined for timestamps maintained with timestamp fields, characteristic statistics may be determined for port numbers within port fields, and the like.

More specifically, the bootstrap process 620 is configured to conduct statistical analytics on data associated with input fields identified by similar data schemas within the simulated samples 615. For example, the bootstrap process 620 may be configured to (i) determine value(s) associated with a different input field(s) identified with the same data schema (e.g., timestamp input fields) for each simulated sample 615 and (ii) conduct an average of these values obtained from the simulated samples 615 to generate an estimated bootstrap mean value. The "estimated bootstrap mean value" represents a mean value of the first set of training data samples 602, and is illustrated as d_hat1 652 and utilized in comparison with a distance result from the distance function conducted as part of the categorical drift detection operations.

For categorical drift detection, the data stream 625 is received and parsed into a plurality of data samples. As illustrated, a first data sample (P) 630 may feature a first set of input fields to maintain a corresponding first set of data points ($X_1$-$X_{50}$) and a second data sample Q 635 may feature a second set of input fields to maintain a corresponding second set of data points ($X_{51}$-$X_{100}$). When ingested (block 640), the first data sample P($X_1$-$X_{50}$) may be utilized as a reference sample operating as a baseline for categorical drift determinations until categorical drift is detected and a new reference sample is needed. While two data samples 630 and 635 are being used to describe the operations conducted by the categorical drift detection component 570 to detect categorical drift, additional data samples subsequent to the second data sample 635 may evaluated for categorical drift in a similar manner.

After receipt of the reference sample 630 and data sample 635, probability distributions are generated for the reference/data samples (block 645). As further shown in FIG. 6, a first probability distribution (P(x)) 650 may be generated based on the reference sample 630. The first probability distribution (P(x)) 650 may be utilized, at least in part, as a reference to determine whether the second data sample 635 (as well as other subsequent, ingested data samples) provide evidence of the data stream 625 is experiencing categorical drift. Additionally, a second probability distribution (Q(x)) 655 may be generated based on the second data sample 635.

Thereafter, a distance function (D) 660 is adapted to receive the first probability distribution P(x) 650 and the second probability distribution Q(x) 655. The distance function 660 may be configured to determine a degree of divergence (result) 665 between data points of a first data schema (e.g., data identifying that the data points are from a first input field type) as represented by probability distributions P(x) and Q(x). From that, the distance function 660 is further configured to determine categorical drift for data point(s) associated with the input field type. Another distance function (or another operations by the distance function 660) would be needed to determine categorical drift for data point(s) associated with a second data schema (i.e., data associated with a second input field type different than the first field input type). As an illustrative example, a first operation by the distance function 660 may be adapted to consider data drift associated with a first data point (e.g., timestamp) while a second operation of the distance function 660 would be needed to consider data drift associated with another data point (e.g., port numbers, etc.).

If the degree of divergence 665 concerning data point(s) associated with the first data schema satisfies d_hat1 562 (e.g., degree of divergence 665 is greater than or equal to d_hat1 562), a potential categorical drift for the data stream 625 is detected (block 670). In response to detection of the potential categorical drift for a first data schema, a flag is set to denote a change point detection (block 675). Updating of the training data samples with the data sample under analysis is throttled until a number of categorical drift detections satisfy a change point threshold ("tolerance" metric) for the data sample (block 680). By establishing a tolerance metric, unnecessary updating of the training data samples is avoided. In contrast, in response to failing to detect potential categorical drift for a first data schema, no flag is set and the "tolerance" level cannot be reached (blocks 685-690). Processing of the data sample continues (block 695).

7.0. Temporal Representation of Categorical Drift Detection

Figure 7B:
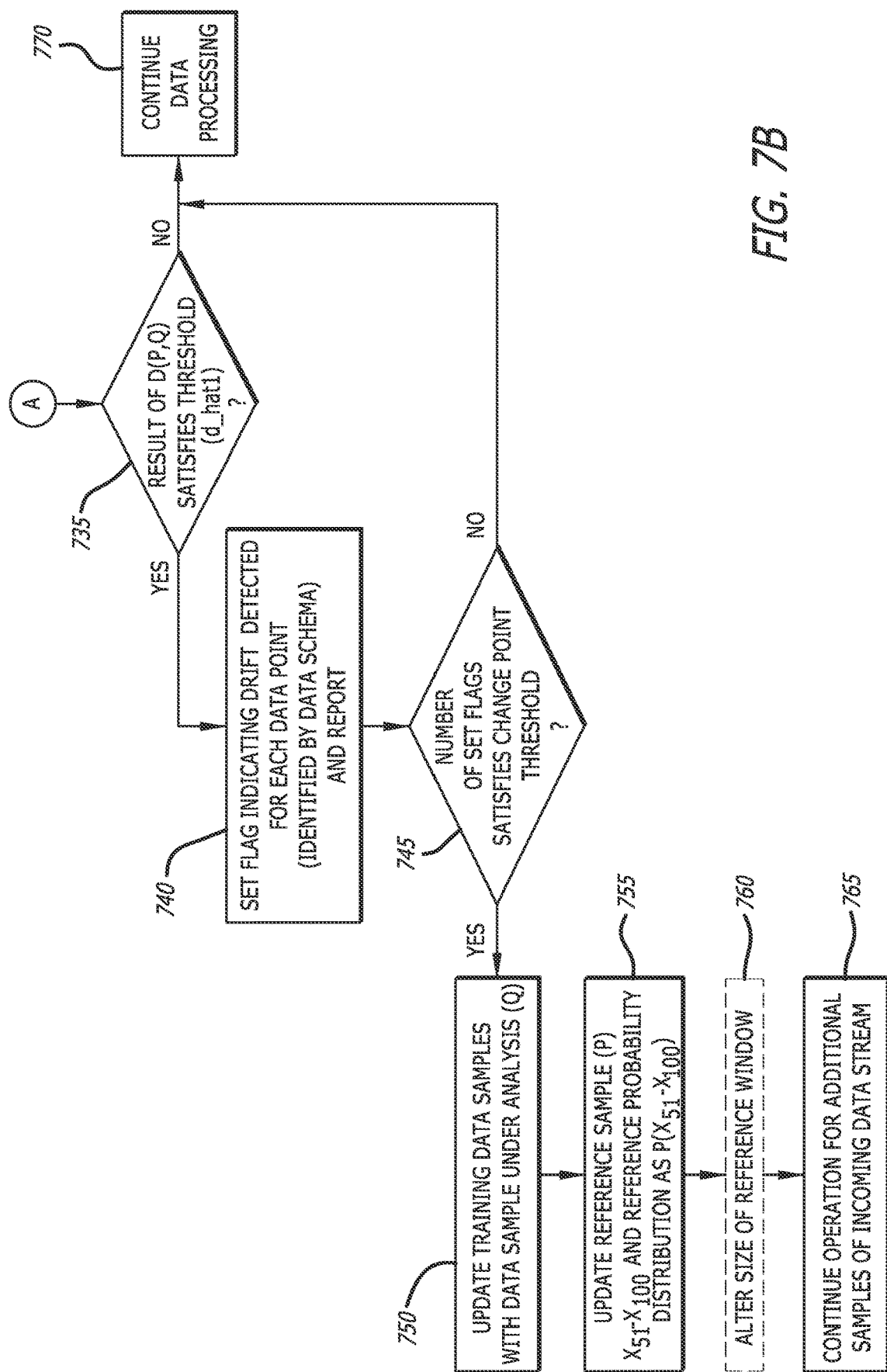

Referring now to FIGS. 7A-7B, exemplary timeline representations illustrating the operations conducted by the categorical drift detection component of FIG. 5C to determine data drift is shown. At time t0, a first data sample of an incoming data stream is ingested by the drift detection subsystem (operation 700). The first data sample is illustrated as including data points $X_1$-$X_{50}$. For this incoming data stream, a reference (baseline) is needed for categorical drift determination, and thus, a reference probability distribution for the first data sample ($P(X_1$-$X_{50})$) is generated (operation 705). The reference probability distribution is stored and maintained until a categorical drift condition is detected (operation 710).

At time $t_1$, a second data sample of the incoming data stream is ingested by the drift detection subsystem (operation 715). The second data sample is illustrated as including data points $X_{51}$-$X_{100}$. For the second data sample, a probability distribution ($Q(X_{51}$-$X_{100})$) is generated, and thereafter, both the probability distribution $Q(X_{51}$-$X_{100})$ and the reference probability distribution $P(X_1$-$X_{50})$ are provided to a distance function (D) (operations 720). The distance function $D(P(X_1$-$X_{50})$, $Q(X_{51}$-$X_{100}))$ operates to determine a degree of divergence (result) between data points associated with a first data schema (e.g., timestamp data points $X_1$ and/or $X_{15}$) to determine whether categorical drift exists for a selected data point or data points (e.g., timestamp) (operation 725). Another distance function or another operations by the distance function (see operation 730) would be needed to determine categorical drift for data point(s) associated with a second data schema different from the first data schema (e.g., port numbers).

If the degree of divergence concerning data point(s) associated with the first data schema satisfies d_hat1 (e.g., degree of divergence (result) is greater than or equal to d_hat1 562 of FIG. 5C), a potential categorical drift for the data stream is detected (operation 735). In response to detection of the potential categorical drift for a first data schema, a flag is set to denote a change point detection and a potential drift condition (operation 740). The potential categorical drift may be reported to the customer via the notification generation component 590 of FIG. 5C.

Updating of the training data samples with the data sample under analysis is held until a number of categorical drift detections satisfy a change point threshold for the data sample (operation 745). If so, the training data samples may be updated with the data sample(s) under analysis (operation 750). The reference sample (P) may be updated as $X_{51}$-$X_{100}$, with probability distribution $P(X_{51}$-$X_{100})$ (operation 755). Optionally, the size of the reference window utilized to select the representative data sample (operation 760).

Based on the above-described operations, continued operations for acquiring different samples of the incoming data stream is supported (operation 765). In contrast, in response to failing to detect potential categorical drift for a first data schema, no flag is set and data processing continues (operation 770).

At time t2, a third data sample of the incoming data stream is ingested by the drift detection subsystem and the process continues as set forth in operations 715-765 (operation 770).

8.0. Categorical Drift Detection Flow

Figure 8A:
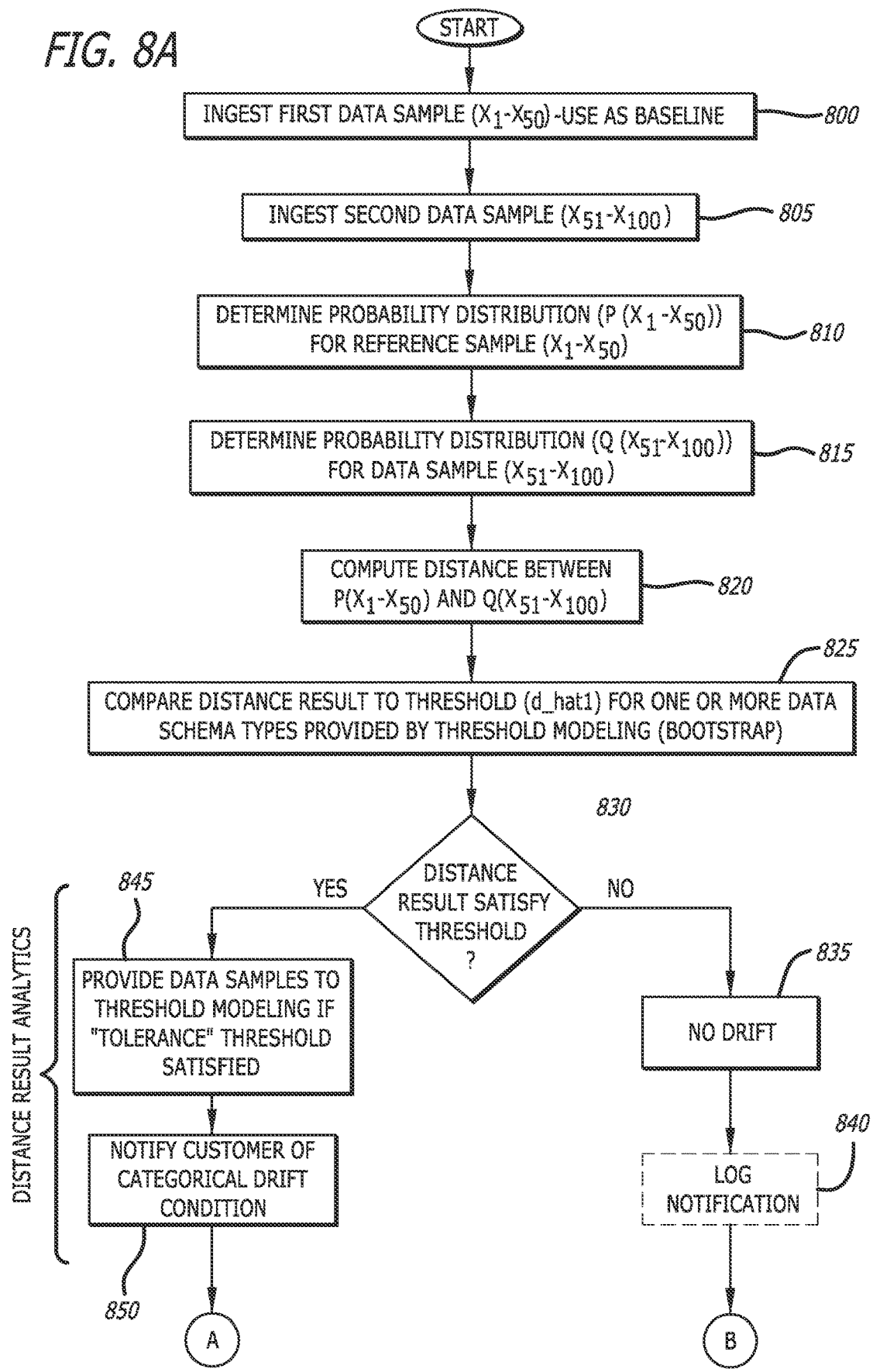
FIG. 8A-8B are a flowchart outlining iterative operations conducted by the categorical drift detection component of FIG. 5C to determine data drift representation.
Figure 8B:
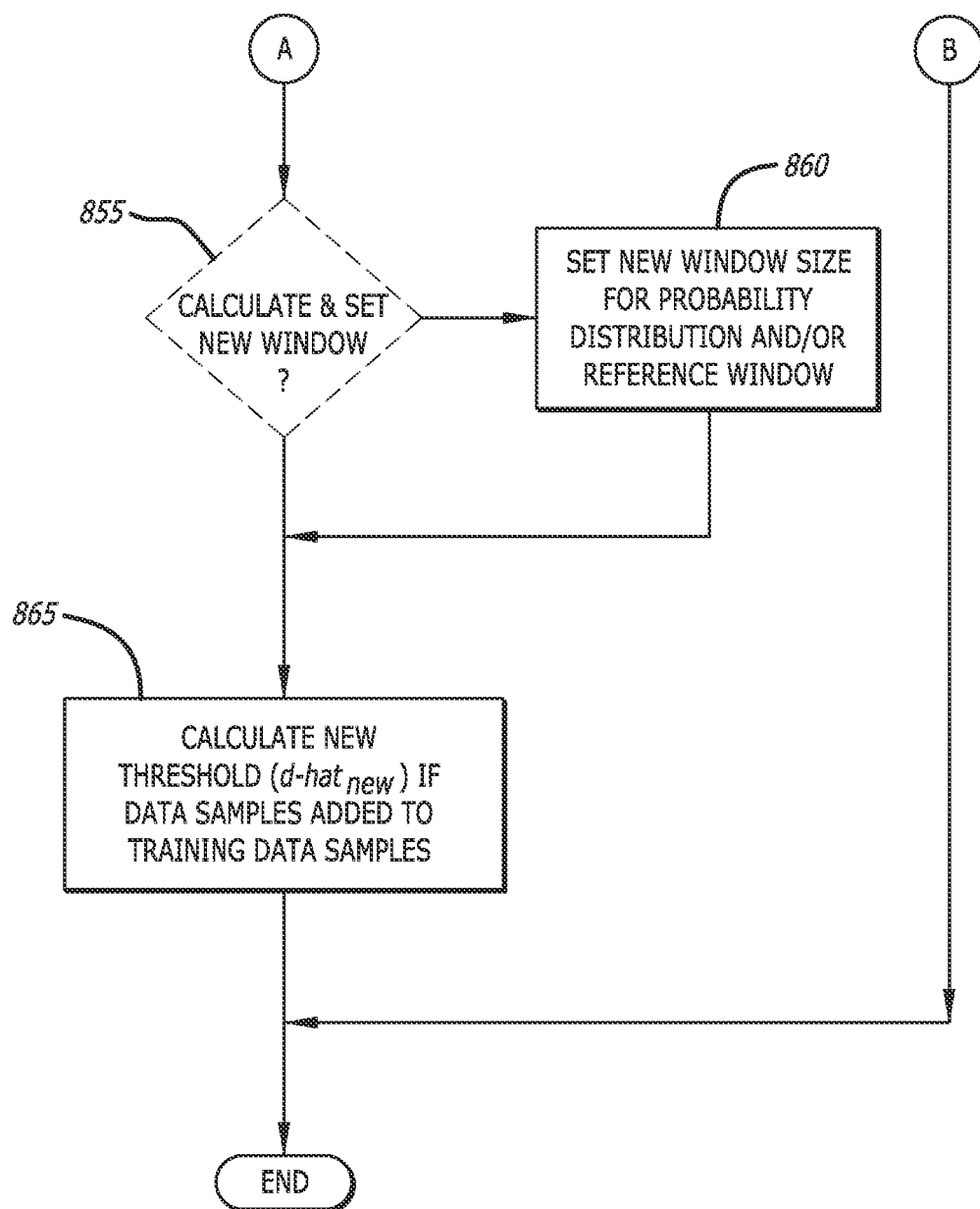

Referring to FIG. 8A-8B, a flowchart outlining a single operational stage conducted by the categorical drift detection component of FIG. 5C to detect a categorical drift condition is shown. Herein, a first data sample, illustrated as including data points $X_1$-$X_{50}$ for convenience, is ingested by the drift detection subsystem for use as the reference sample (operation 800). Thereafter, a second data sample of the incoming data stream, illustrated as including data points $X_{51}$-$X_{100}$ for convenience, is ingested by the drift detection subsystem (operation 805). For the reference sample, a reference probability distribution $P(X_1$-$X_{50})$ is generated (operation 810). For the second data sample, a probability distribution $Q(X_{51}$-$X_{100})$ is generated (operation 815).

Once the probability distributions ($P(X_1$-$X_{50})$, $Q(X_{51}$-$X_{100})$) are generated, both the probability distribution $Q(X_{51}$-$X_{100})$ and the reference probability distribution $P(X_1$-$X_{50})$ are provided to a distance function (D) to generate a distance result (operations 820). The distance result identifies a degree of divergence (result) between a targeted data point associated with a first data schema (e.g., content of a first input field). Thereafter, by comparing the distance result to sample statistics (d_hat1), which represents a threshold value signifying a categorical drift, a determination can be made as to whether categorical drift exists for the targeted data point (operations 825-830).

If no categorical drift is detected, this operational stage ends, and optionally the analytics results may be logged (operations 835-840). However, a categorical drift is detected, the data sample is not provided until a prescribed number of data points associated with the data sample identify potential categorical drift conditions (operation 845). Thereafter, a customer associated with the data stream is notified of the categorical drift condition for potential remediation (operation 850).

Given the data stream is experiencing data drift, a window size for generation of the sample statistics may be needed to account for the data drift (operations 855-860). Furthermore, a new reference sample is needed to account for the data drift before data drift analytics are conducted for the next data sample (operations 865).

9.0. Format Drift Detection Operational Flow

Referring now to FIG. 9, a block diagram illustrating an embodiment of format drift detection processes is shown, as conducted by the format drift detection component 575 in combination with the threshold modeling component 565 and the sliding window adjustment component 585 of FIG. 5C. According to this embodiment of the disclosure, as described above, the threshold modeling component 560 maintains or is provided access to the data store including the training data samples 600. The training data samples 600 are data samples organized from the same data source and/or same schema. Hence, where an incoming data stream is from a first data source, the set of training data samples 602 are associated with the first source are referenced.

More specifically, the reference window 605 is sized to collect a representation of data samples 610 from the first set of training data samples 602. A sizing of the reference window 605 may be based on customer data such as performance metrics 607 (e.g., number of issued alert messages that have been determined by the customer to be false positives and false negatives). The representation of data samples 610 may collectively correspond to data samples from a source of a data stream 920 ingested for analysis.

From the representative data sample(s) 610, the bootstrap process 900 may be configured to identify, using the data schema, different types of data points associated with the representative data sample(s). Thereafter, the bootstrap process 900 may be configured to (i) cluster data points of similar types, (ii) extract format representations associated with each of the clustered data points, and (iii) conduct hash operations on each of these format representations to produce hashed format representations for each of the data points associated with the representative data sample(s) 610. As or after the hashed format representations are generated, one or more counters may be actuated to maintain a count value for each of these distinct hashed format representations. For each type of data point (e.g., timestamps, port numbers, etc.), count values associated with each of the hashed format representations is maintained. From the count values 910, the bootstrap process 900 may generate statistics d_hat2 564 for each data point type. For example, statistics d_hat2 564 may include count values pertaining to different formats utilized by timestamps, count values pertaining to different formats utilized by ports, or the like.

For format drift detection, the data stream 920 is received and parsed into a plurality of data samples. As illustrated, a first data sample (P) 930 of the data stream 920 may feature a first set of input fields to maintain a corresponding first set of data points ($X_1$-$X_{50}$) and a second data sample Q 935 may feature a second set of input fields to maintain a corresponding second set of data points ($X_{51}$-$X_{100}$). When ingested (block 940), data schema from each input field of the first data sample P($X_1$-$X_{50}$) is accessed to determine data point type prior to extracting and conducting data transformations (e.g., hashing) on format representations for the input fields to produce count values.

The first count values (CV1) 950 of hashed format representations associated with each data point type within the first data sample (P) 930 are maintained and operate as a count reference for format drift determinations until format drift is detected and a new reference is needed. The second count values (CV2) 955 of hashed format representations associated with each data point type within the second data sample (P) 935 are maintained for use in determining format drift between the second data sample (Q) 935 and the reference sample (P) 930. While count values 950 and 955 associated with two data samples 930 and 935 are being used to describe the operations conducted by the format drift detection component 575 to detect format drift, additional data samples may evaluated for format drift in a similar manner.

After receipt of count values 950 and 955 associated with the reference sample 930 and second data sample 935, probability distributions are generated for count scheme associated with the reference/data sample (block 960). As further shown in FIG. 9, a first probability distribution (P(x)) 960 may be generated based on the count value 950 associated with the reference sample 930. The first probability distribution (P(x)) 960 may be utilized, at least in part, to determine whether the second data sample (Q) 935 (as well as other subsequent, ingested data samples) provide evidence of the data stream 920 is experiencing format drift. Additionally, a second probability distribution (Q(x)) 965 may be generated based on the count values 955 associated with the second data sample 935.

Thereafter, a distance function (D) 970 is adapted to receive the first probability distribution P(x) 960 and the second probability distribution Q(x) 965. The distance function 970 may be configured to determine a degree of divergence (result) 975 between data points deployed within input fields of the reference sample (P) 930 and the second data sample (Q) having a first data schema. The degree of divergence 975 is relied upon to determine format drift associated with prescribed data point(s) within data samples sourced by the data stream 920. Another distance function (or another operations by the distance function 970) would be needed to determine format drift between data points deployed within input fields of the reference sample (P) 930 and the second data sample (Q) having a second data schema, where the second data schema is different than the first data schema. As an illustrative example, a first operation by the distance function 970 may be adapted to consider format drift associated with a first data point (e.g., timestamp) while a second operation of the distance function 970 would be needed to consider data drift associated with another data point (e.g., port numbers, etc.).

If the degree of divergence 975 concerning data point(s) associated with the first data schema satisfies d_hat2 564 (e.g., degree of divergence 975 is greater than or equal to d_hat2 564), a potential format drift for the data stream 920 is detected (block 980). In response to detection of the potential format drift for a first data schema, a flag is set to denote a change point detection (block 982). Updating of the training data samples with the data sample under analysis is throttled until a number of format drift detections satisfy a second change point threshold ("format tolerance" metric) for the data sample (block 984). In contrast, in response to failing to detect potential format drift for a first data schema, no flag is set and the "format tolerance" level cannot be reached (blocks 990-992).

10.0 Format Anomaly Detection Operational Flow

Figure 10:
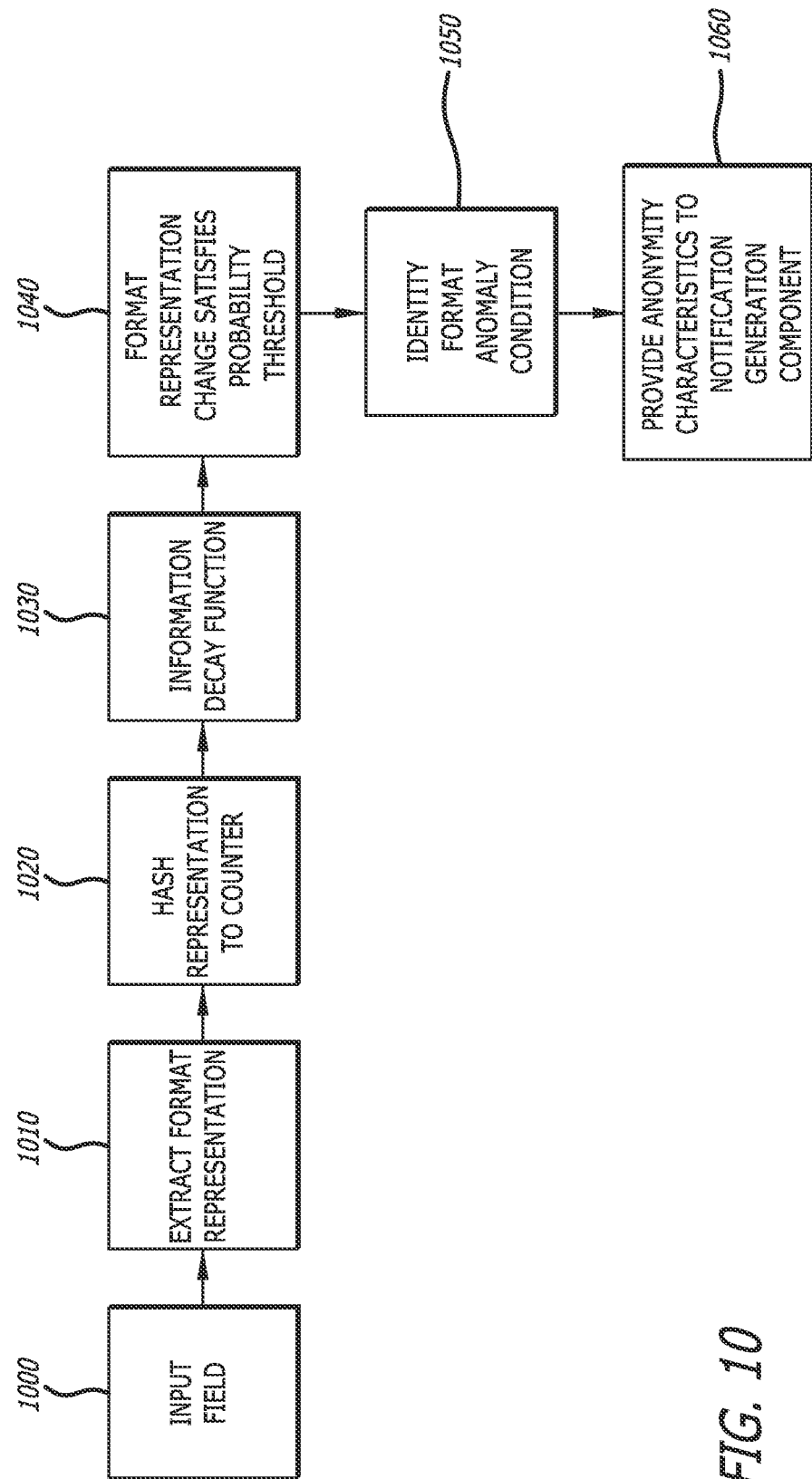
FIG. 10 is a block diagram illustrating an embodiment of the operations conducted by the format anomaly detection component of FIG. 5C to detect format anomalies.

Referring now to FIG. 10, a block diagram illustrating an embodiment of the operations conducted by the format anomaly detection component 580 of FIG. 5C to detect format anomalies is shown. Herein, for one or more input fields within a data sample under analysis, the format anomaly component is configured extracts a format representation associated with each input field(s) (operations

1000 & 1010). The format representation may be transformed to a unique value (e.g., undergoes a one-way hash function to generate a hash value), where counters are established to maintain a count value associated with the number of similar format representation transformations that occur within a data sample and/or within a data stream including the data sample (operation 1020). As an illustrative example, counters may be created to maintain a first number of hash values associated with a first format representation associated with a timestamp input field and maintain a second number of hash values associated with a second format representation that is detected for a timestamp input field. Hence, the count values represent different format representations uncovered for same data point type (e.g., input fields utilized for timestamp retention).

Thereafter, the count values are evaluated by an information decay function to determine the frequency or infrequency of a format representation change (operation 1030). Herein, an "infrequent" format representation change constitutes a single occurrence or an infrequent deviation in format representations (e.g., infrequent being greater than a prescribed time between similar format representations such as an hour, a day, etc.). The information decay function generates a probability output, where a lower probability output (e.g., less than 1%) satisfies a probability threshold identifying a presence of a format anomaly, not a format drift condition (operations 1040 & 1050). Upon detecting a format anomaly, the anomaly characteristics are provided to the notification generation component 590 of FIG. 5C for generation of an alert message (operation 1060).

11.0 Continuous Drift Detection Architecture Specific Description

Data processing environment may include and execute logic configured to detect changepoints. Such detection may be automatically initiated by a data ingestion analytic subsystem within the data processing environment (described below). The data ingestion analytic subsystem is responsible for detecting changepoints. Changepoints are abrupt variations in the underlying distribution of data, and occur when the probability distribution of a stochastic process or time series changes. In general, changepoint detection concerns detecting whether a change has occurred (or whether several changes might have occurred) in addition to identifying the times of any such changes. To that end, where a probability distribution at a point exceeds a prescribed threshold (e.g., one or more standard deviations from a mean ingestion value, prescribed percentage deviation from mean ingestion count, or the like), then a changepoint may be detected at that point. Additionally, or in the alternative, the data ingestion analytic subsystem may be configured to operate as an automated process so as to detect and/or report changepoint detection to a client device associated with the tenant to which the potential changepoint may apply. The automated process may be triggered to conduct such analytics online streaming, i.e., in real-time. The changepoint detection method herein may be operable based on the Bayesian interpretation of probability and Bayesian statistics. It should be noted that, while the Bayesian statistics is used to detect the changepoints, any other suitable statistical technique can be used to detect the changepoints.

Independent of the changepoint detection solution, an overarching challenge for detecting changepoints has been the unbounded data streamed in unprecedented volumes and varieties, in diverse domains such as application logs and metrics monitoring, wearable devices, sensor devices, and more. In many such domains, the ability to analyze data on the stream is valuable from an early detection and response perspective, which may be challenging for algorithm designers. When analyzing data offline, it is reasonable to assume the data is generated by a fixed process. That is, for example, the data is a sample from a static (albeit multimodal) distribution. However, on the stream and in real-time, there is a temporal dimension, and the generative parameters of a data stream can change. The quantification and detection of changepoints is a challenge in the streaming setting. Although machine learning can improve the efficiency and accuracy of detecting changepoint, currently, batch machine learning models working offline, which trained on previous datasets, need to undergo parameter update through retraining. Such retraining procedures is time-consuming and occur offline.

The vast majority of changepoint detection techniques focus on the retrospective segmentation problem where, after the entire data stream is observed, the algorithm has to detect any changepoints. Moreover, current models of computation do not allow indefinitely postponing when to output a changepoint. In such a setting, a priori unknown number of points arrive one by one in an arbitrary order. When a new point arrives, the algorithm must either flag the point as a changepoint or decide whether the generative parameters of the data distribution have sufficiently drifted for that point to be considered a changepoint. The quality of such an algorithm depends on how much data is needed to see to determine a distribution shift. At the same time, subsequent delay in detecting changepoints causes staleness in trained models. Generally, the faster a changepoint is detected, the faster a machine learning model can be updated.

In the streaming model of computation, any changepoint detection algorithm must consume the data in one pass and is allowed to keep only a small (typically constant or poly-logarithmic in n) amount of information. Even further, it is only allowed to output machine learning algorithms' final decisions once the stream has ended.

To tackle the above-mentioned problems, an online streaming changepoint detection algorithm on a budget is disclosed, which may store a pre-defined constant amount of information, independent of the size of the stream. Disclosed herein are online streaming changepoint (i.e., drift) detection algorithms that work on unbounded data stream with a constant time and space complexity. In some embodiments, along with univariate drift detection, multivariate case where covariance drift occurs, may also be detected. Furthermore, a hyperparameter auto-tune approach is disclosed to improve warming up the online algorithms. It is worth mentioning that, hereinafter, the terms "changepoint" and "drift" may be used interchangeably.

11.1. Data Processing Environment

Figure 11A:
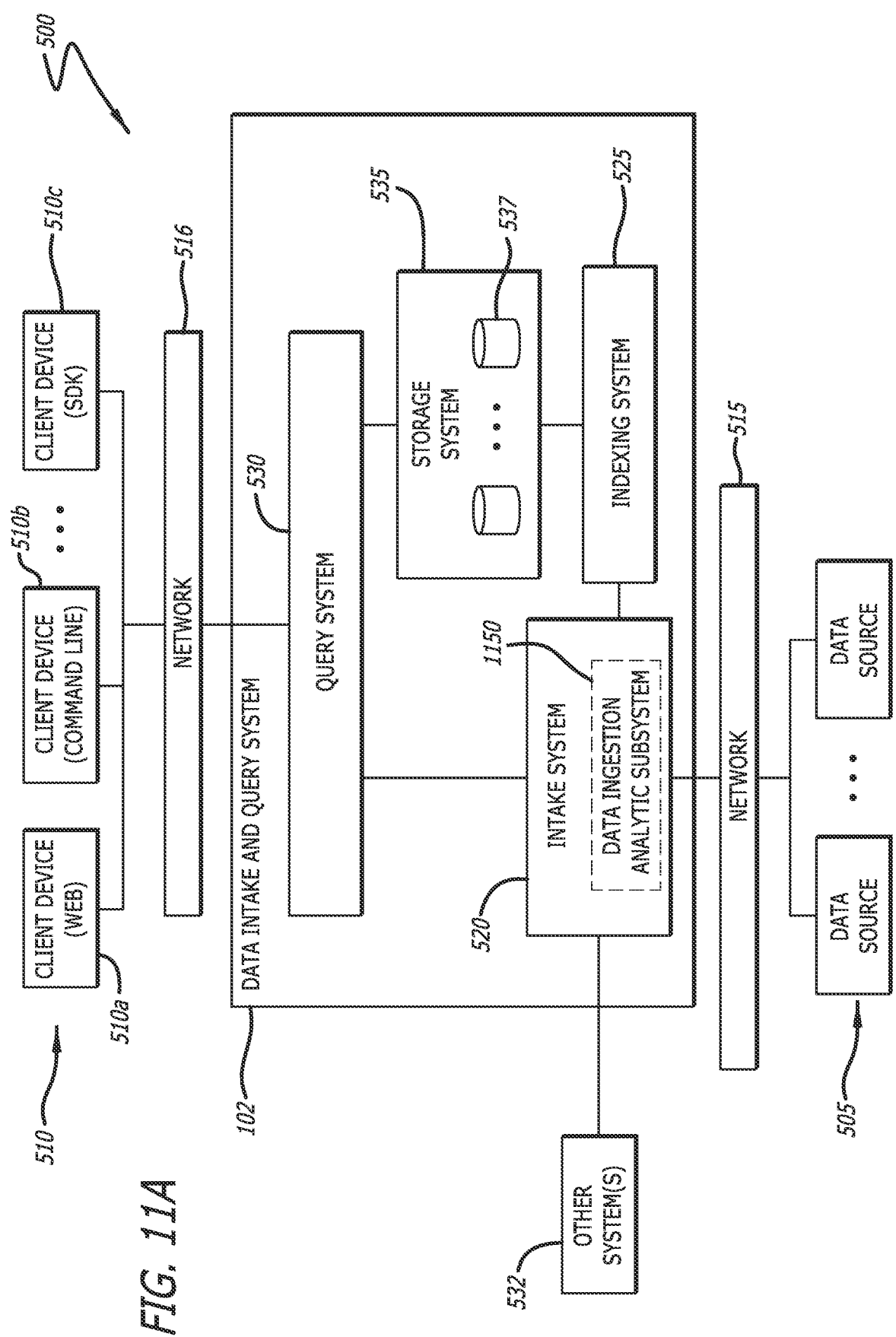
FIG. 11A is a block diagram illustrating an embodiment of a data processing environment including a data ingestion analytic subsystem.

Referring to FIG. 11A, a block diagram illustrating an embodiment of a data processing environment 500 including a data ingestion analytic subsystem 1150 is shown. The data processing environment 500 features one or more data sources 505 (generically referred to as "data source(s)") and client devices 510*a*, 510*b*, 510*c* (generically referred to as "client device(s) 510") in communication with the data intake and query system 102 via networks 515 and 516, respectively. The networks 515 and 516 may correspond to portions the same network or may correspond to different networks. Further, the networks 515 and 516 may be implemented as private and/or public networks, one or more LANs, WANs, cellular networks, intranetworks, and/or internetworks using any of wired, wireless, terrestrial microwave, satellite links, etc., and may include the Internet.

Figure 11B:
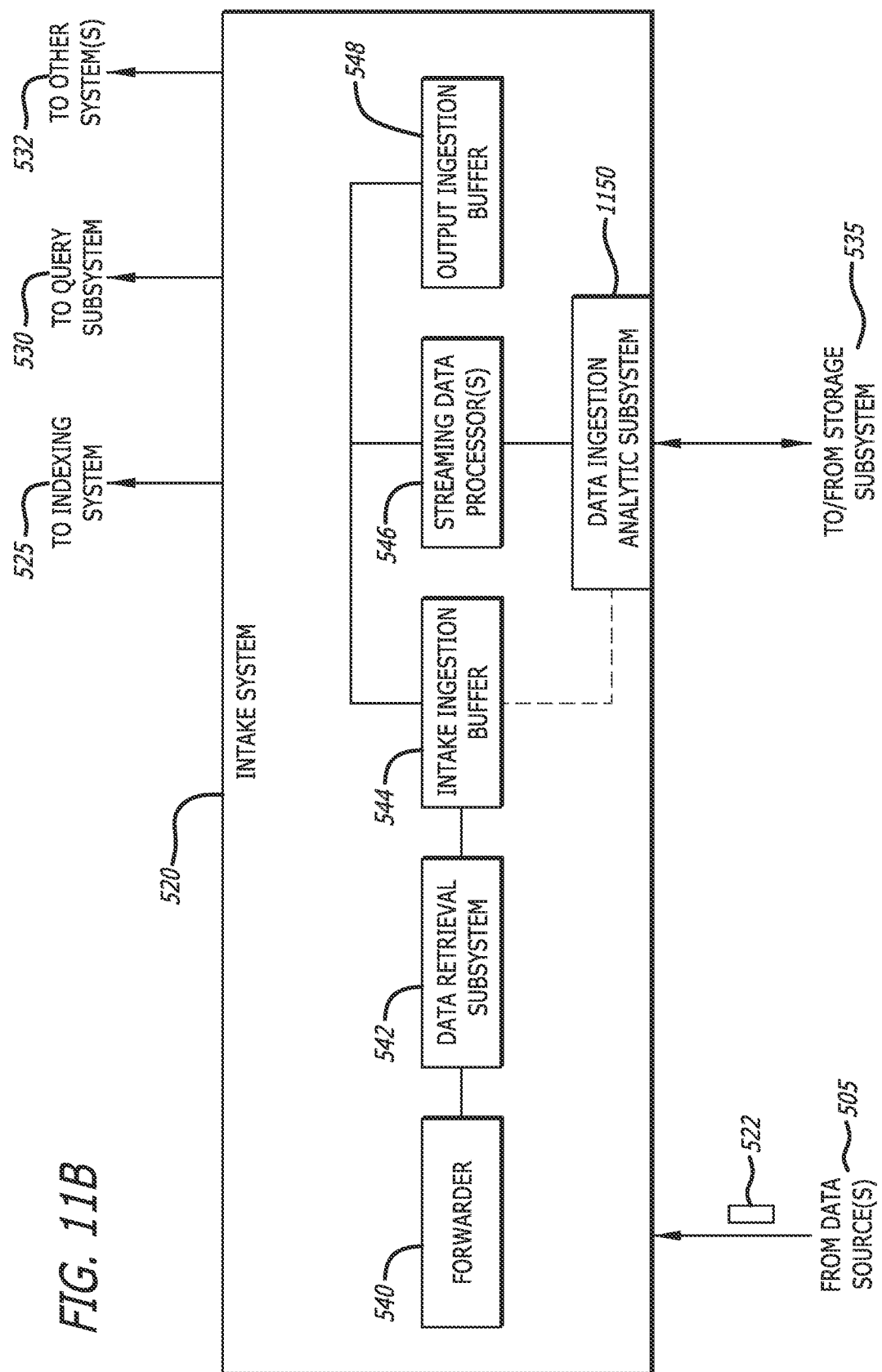
FIG. 11B is a block diagram illustrating an embodiment of the operational flow of information between subsystems within the intake system of the data intake and query system of FIG. 1, including the data ingestion analytic subsystem of FIG. 11A.
Figure 11C:
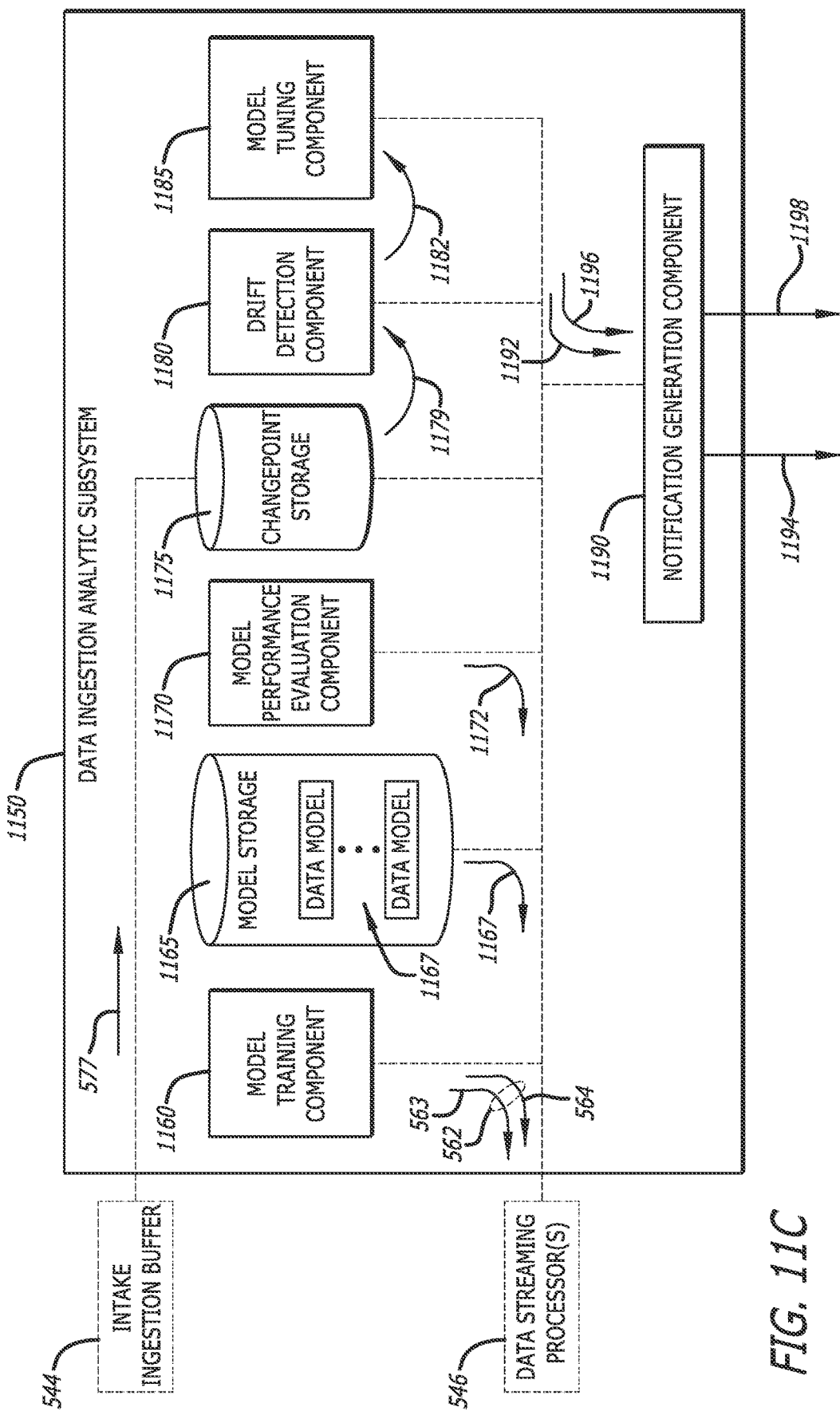
FIG. 11C is a block diagram illustrating an embodiment of the components forming the data ingestion analytic subsystem operating with the streaming data processor(s) deployed within the intake system of FIG. 11B.

Many of the components or subsystems illustrated in FIGS. 11A-11C are equivalent as those illustrated in FIGS. 5A-5C. As those components and subsystems have been discussed, such discussion will not be repeated here for purposes of brevity. Thus, unless otherwise note hereinafter, components or subsystems illustrated in FIG. 11A also illustrated in FIGS. 5A-5C include the same functionality and may be configured to perform the same operations as discussed above.

In contrast to the embodiments discussed above with respect to FIGS. 5A-5C, the embodiments illustrated in FIGS. 11A-19 and discussed hereinafter include an intake system 520 that includes a data ingestion analytic subsystem 1150 comprised of several components and subsystems configured to detect changepoints in distributions of received data, and in particular, in received data streams. Specifically, as will be discussed in detail below, the data ingestion analytic subsystem 1150 is configured to perform changepoint detection on streaming data, both univariate and multivariate data, through deployment of an improved and novel Bayesian changepoint detection algorithm. The embodiments discussed improve upon current changepoint detection by bounding the storage utilized and thus enabling the data ingestion analytic subsystem 1150 to perform changepoint detection operations on streaming data. Additionally, embodiments discussed below described expanding changepoint detections operations deployed in univariate data drift detection to multivariate data drift detection. Still further embodiments discussed below discuss the novel technique of tuning hyperparameters of the changepoint detection algorithm, which functions to improve the deployment of the algorithm.

Additionally, as shown in FIG. 11B, the data ingestion analytic subsystem 1150 is configured for processing by the streaming data processor 546 to analyze data ingestion volumes to determine changepoints.

In particular, the data ingestion analytic subsystem 1150 features or utilizes data models, such as data models inclusive of machine learning models trained to perform various functions based on selected metrics. The metrics may include, but are not limited or restricted to temporal metrics such as a day of the week, a time of the day, and/or whether the day constitutes a holiday or not. Herein, a "holiday" represents a day set aside by a tenant associated with the incoming data 522 or a governmental entity in accordance with a custom or law on which normal activities, especially business or work including school, are suspended or reduced.

As described above, the data ingestion analytic subsystem 1150 may be configured to operate at least in one of three different modes of operation: (1) a training mode, (2) a model performance evaluation mode; or (3) a data ingestion prediction mode. In training mode, the data ingestion analytic subsystem 1150 operates to train data models through ingestion data pairs that may be based on events ingested by the data processing environment 500 during a prior time interval (e.g., measured unit of time utilized as a reference time unit for training such as one hour ingestion intervals). Stored internally within the data ingestion analytic subsystem 1150 or within the storage system 535 that may operate as local or cloud storage, an "ingestion data pair" may include, but is not limited or restricted to (i) a time stamp which is representative of the day and time in which the data was ingested, (ii) a parameter that indicates whether the data constitutes a holiday for that particular tenant, and (iii) a number of events representing machine data ingested by the data intake and query system 102 within an interval represented by the timestamp.

In model evaluation mode, the data ingestion analytic subsystem 1150 operates to test one or more machine learning models through a simulation of real-time changepoint detection, where the simulation may rely on synthetically-generated data and/or real ingestion data. For example, the synthetic data may be created and modified to include known changepoints such as (i) a "spike" (substantial increase in usage or substantial increase in the any other suitable parameter) and/or an "outage" (substantial decrease in usage or any other suitable parameter), and/or (ii) an altered pattern of usage representative of a pattern anomaly which may be used to detect a changepoint. Also, the synthetic data may be created to represent various, different data trends in order to simulate real-world long term trends.

In data ingestion prediction mode, the data ingestion analytic subsystem 1150 operates to predict, based on a selected machine learning model, data ingestion characteristics, such as data ingestion volumes at a prescribed time interval. The predicted data ingestion volumes may be compared to actual data ingestion realized during the prescribed time interval to determine a data ingestion prediction error. The data ingestion prediction error, when exceeding a threshold, warrants a transmission of one or more different types of notifications, which may represent detection of a changepoint, to be issued to one or more targeted client devices 510.

In summary, the data models utilized by the data ingestion analytic subsystem 1150 may be trained based on data sets associated with past data (e.g., moving window of data to capture most recent data sets while excluding older data sets) in order to learn patterns and trends associated with that past data, which allows the data model to make predictions on the most recent time points and provide simulated predictions over a prescribed time interval, such as a hour, half-hour, five minutes, each minute, etc. Through continuous re-training on new incoming data, the data models may be adapted to changes in patterns and trends.

11.2. Continuous Drift Detection Operational Flow

Referring now to FIG. 11C, a block diagram illustrating an embodiment of components forming the data ingestion analytic subsystem 1150, which is operating with the streaming data processor(s) 546, deployed within the intake system 520 of FIG. 11B is shown. The data ingestion analytic subsystem 1150 includes a model training component 1160, model storage 1165, a model performance evaluation component 1170, a changepoint storage 1175, a drift (i.e., changepoint) detection component 1180, a model tuning component 1185, and a notification generation component 1190.

According to this embodiment of the disclosure, one or more data models 1167 are stored in the model storage 1165 operating as local storage or cloud-based storage, where these data models 1167 are periodically or aperiodically trained by the model training component 1160 when the data ingestion analytic subsystem 1150 is operating in training mode. Such training may involve the loading of ingestion data pairs 562, which may be representative of events ingested during a prior time interval, into at least one of the data models 1167 operated by the data streaming processor(s) 546. Each of the ingestion data pairs 562 may include, but is not limited or restricted to (i) a time stamp 563 representing a day and time in which the data was ingested and (ii) a holiday parameter 564 representing whether the day constitutes a holiday (and perhaps the granularity of the particular holiday).

When the data ingestion analytic subsystem 1150 is operating in model performance evaluation mode, the model performance evaluation component 1170 may be configured to conduct testing of one or more of the machine learning models 1167 maintained within the model storage 1165 to determine that the model is operating correctly and adequately for the detection of changepoints. Herein, the model performance evaluation component 1170 may generate data sets 1172 based on synthetic data and/or real ingestion data. The data sets 1172 may include data without known as not changepoints and/or data with known changepoints such as a data ingestion spike, or a data ingestion outage. Additionally, or in the alternative, the model performance evaluation component 1170 may be configured to conduct testing of the drift detection component 1180 and the stored changepoints maintained within the changepoint storage 1175 to determine that the drift detection component 1180 is operating correctly and adequately for the detection of changepoints.

Referring still to FIG. 11C, the data ingestion analytic subsystem 1150 further includes the changepoint storage 1175 configured to store one or more detected changepoints over a selected time interval (data point). This selected time interval may be automatically selected as a next time interval for data ingestion by the system or may be manually selected by an administrator via a query from a client device (e.g., client device 510a) of FIG. 11A.

The drift detection component 1180 is in communication with the changepoint storage 1175, in that once a changepoint is detected, the drift detection component 1180 transmits the changepoint to the changepoint storage, where the transmitted changepoint is stored. Additionally, or in the alternative, the drift detection component 1180 may transmit one or more information related to the transmitted changepoint to the changepoint storage as metadata. Such metadata may include the time of detection of the changepoint or any other suitable information regarding the changepoint. Alternatively, the drift detection component 1180 may store the metadata within the drift detection component 1180.

The model performance evaluation component 1170 may evaluate the performance of the drift detection model 1180 which is sensitive to initial hyperparameter settings. For example, and as will be discussed in further details below, excess false positives in particular may arise from the cold start of the algorithm, where the hyperparameters fail to adapt to the data distribution quickly. To speed up the learning process and automatically adapt the machine learning algorithm to incoming data in an online fashion, the model tuning component 1185 may use an auto hyperparameter tuning approach. The model tuning component 1185 may receive the detected changepoints 1182, and/or any other non-changepoint data points, from the drift detection component 1180. Alternatively, the model tuning component 1185 may receive data indicating a need for tuning the models from the model performance evaluation component 1170. In some embodiments, the model tuning component 1185 may infer a posterior Student T-test distribution of run length and estimate its mean $\mu_x$ and variance $\delta_x^2$ with a sample of data observed so far. Thus, the model tuning component 1185 may reduce two degrees of freedom for the initial values of $\beta$ and $\mu$, with the initial value for $\beta$ denoted as $\beta_0$, and correspondingly for the other hyperparameters $\alpha_0$, $\kappa_0$, $\sigma^2$.

$$\beta_0 = x/(K_0+1)$$

$$\mu_0 = \mu_x$$

The model tuning component 1185 may estimate the initial values for both $\beta$ and $\mu$ from the data observed from the stream. In this way, the model tuning component 1185 warms up the algorithm quickly and efficiently, where hyperparameters are automatically adapted to the data observed instead of being hard-coded to initial settings. For efficiency, the model tuning component 1185 may put the first several data points in the buffer to estimate the hyperparameters. That is, mean and variance of the first several data points are calculated and used as estimated mean and variance for the posterior distribution. The size of the buffer may have insignificant effect on the warmup process, as long as a broad estimation of the distribution parameters can be inferred.

As mentioned above, the model tuning component 1185 may receive data indicating a need for tuning the models from the model performance evaluation component 1170. For example, the model performance evaluation component 1170 may determine that the error in detecting changepoints has exceeded a pre-determined threshold. According to some embodiments of disclosure, the pre-determined threshold may be determined in accordance with the number of standard deviations of a mean absolute error.

In some embodiments, a notification may be initiated when a changepoint, or a certain number of changepoints are detected. Additionally, or in the alternative, if any of one or more pre-defined thresholds are satisfied, the model tuning component 1185 may signal the notification generation component 1190 of the detected changepoint.

The notification generation component 1190 may be communicatively coupled to the drift detection component 1180 so that, when the drift detection component 1180 detects a changepoint that satisfies a threshold value, the notification generation component 1190 may issue a notification which may be representative of a message to the client device 510A, 510B and/or 510C in order to advise network administrators associated with a tenant that is consuming the data of a potential data ingestion pipeline disturbance. The notification may be a warning 1194 in response to receipt of a first signal 1192 from the drift detection component 1180. The notification may take the form of a dashboard alert, email message, text message, telephone call, audible alarm, or other notification scheme that signifies that a changepoint has been detected and to investigate the data ingestion issue when available. Alternatively, the notification may be an alert 1198 in response to receipt of a second signal 1196. The alert 1198 may take the form of one or multiple (two or more) of the notification methods (dashboard alert, email message, text message, telephone call, audible alarm, etc.) being performed concurrently, where the alert 1198 may signify a more severe changepoint that may require more immediate attention than data ingestion pipeline disruption associated with the warning 1194.

12.0. Continuous Drift Description

Figure 12:
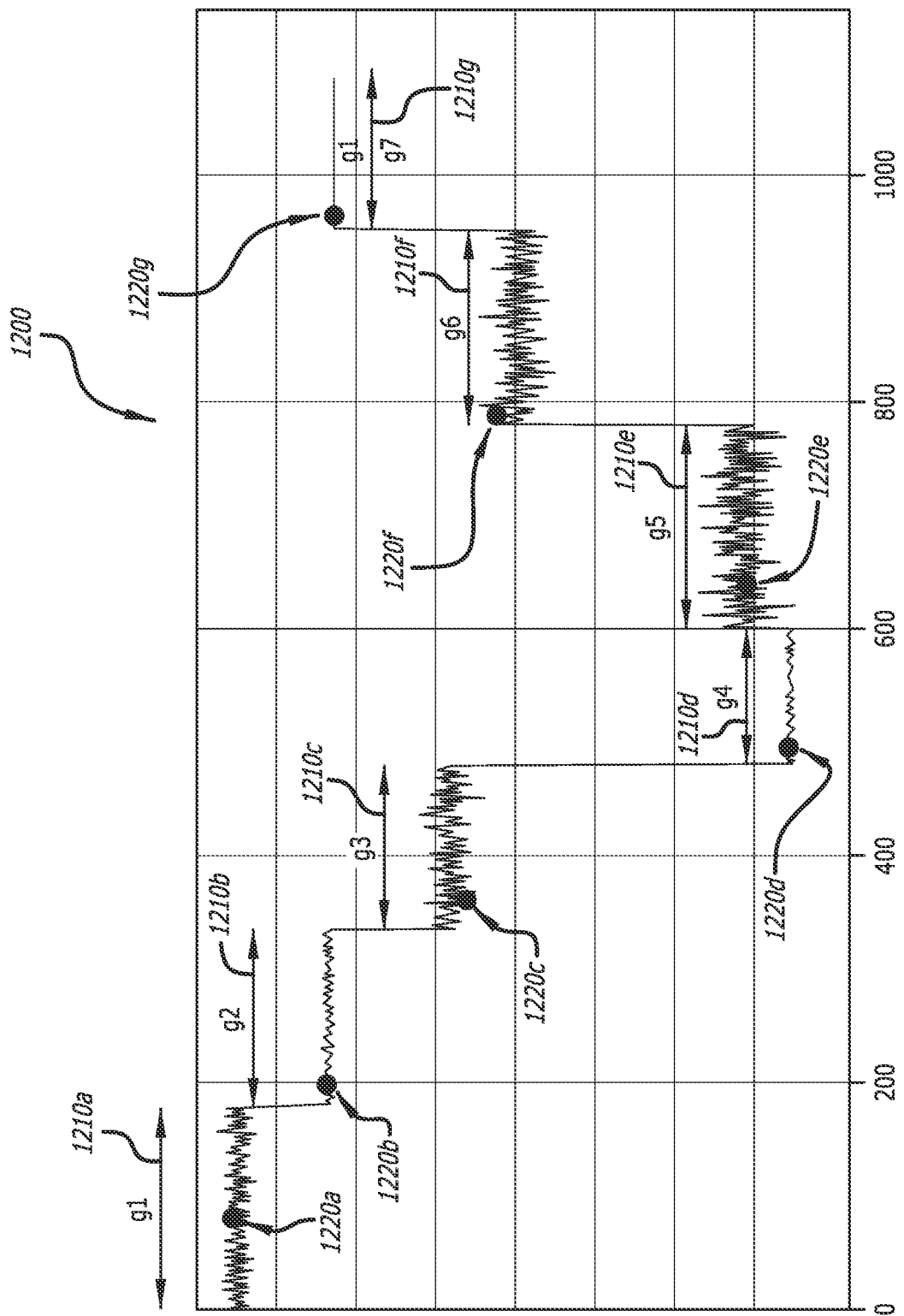
FIG. 12 is a graphical representations of different types of changepoints detected by the data ingestion analytic subsystem of FIGS. 11A-11C.

Referring now to FIG. 12, a graphical representations of different types of changepoints 1200 detected by the data ingestion analytic subsystem 1150 of FIGS. 11A-11C is shown. As noted above, a changepoint is an instance in time, where the statistical properties before and after this time point differ. Drift/changepoint detection is the task of identifying such point in time. Herein, as illustrated in FIG. 12, a first type of changepoint 1220f may constitute a spike in data points trend, e.g., data partition g5 compared to data partition g6, in which the trend of data ingested by the system constitutes a substantial increase from data ingestion trend for that particular time interval/partition (e.g., day/time/holiday) or from the trend of the previous data partition. A second type of changepoint 1220d may constitute a sustained outage/sudden decrease in data ingestion trend, e.g., data partition g3 compared to data partition g4, in which the trend of data ingested by the system has decreased significantly. Each of these changepoint types 1220d and 1220f may constitute substantial change in the data trend over expected data ingestion.

Similarly, a third type of changepoint 1220e may constitute an anomalous volume, e.g., volume of the data partition g5 1210e compared to the volume of the data partition g4 1210d. This anomalous volume 1210e deviates from an established pattern so that a difference between data ingestion at 1220e differs from an expected data ingestion volume 1210d by a pre-determined threshold. It should be noted that, current changepoint detection methods often suffer from a significant false positive and/or false negative error detection. A false positive error, or false positive, is a result that indicates a given condition exists when it actually does not. A false positive error is a type I error where the test is checking a single condition, and wrongly gives an affirmative (positive) decision. Similarly, a false negative error, or false negative, is a test result which wrongly indicates that a condition does not hold. A false negative error is a type II error occurring in a test where a single condition is checked for, and the result of the test is erroneous, that the condition is absent. As a non-limiting example shown in FIG. 12, the detected changepoint 1220a in data partition g1 is a false positive. That is, although a conventional detection model may detect that point as a changepoint, it is not an actual changepoint since there is no change in the probability distribution of the data points before and after data point 1220a.

13.0. Continuous Drift Representation

Figure 13:
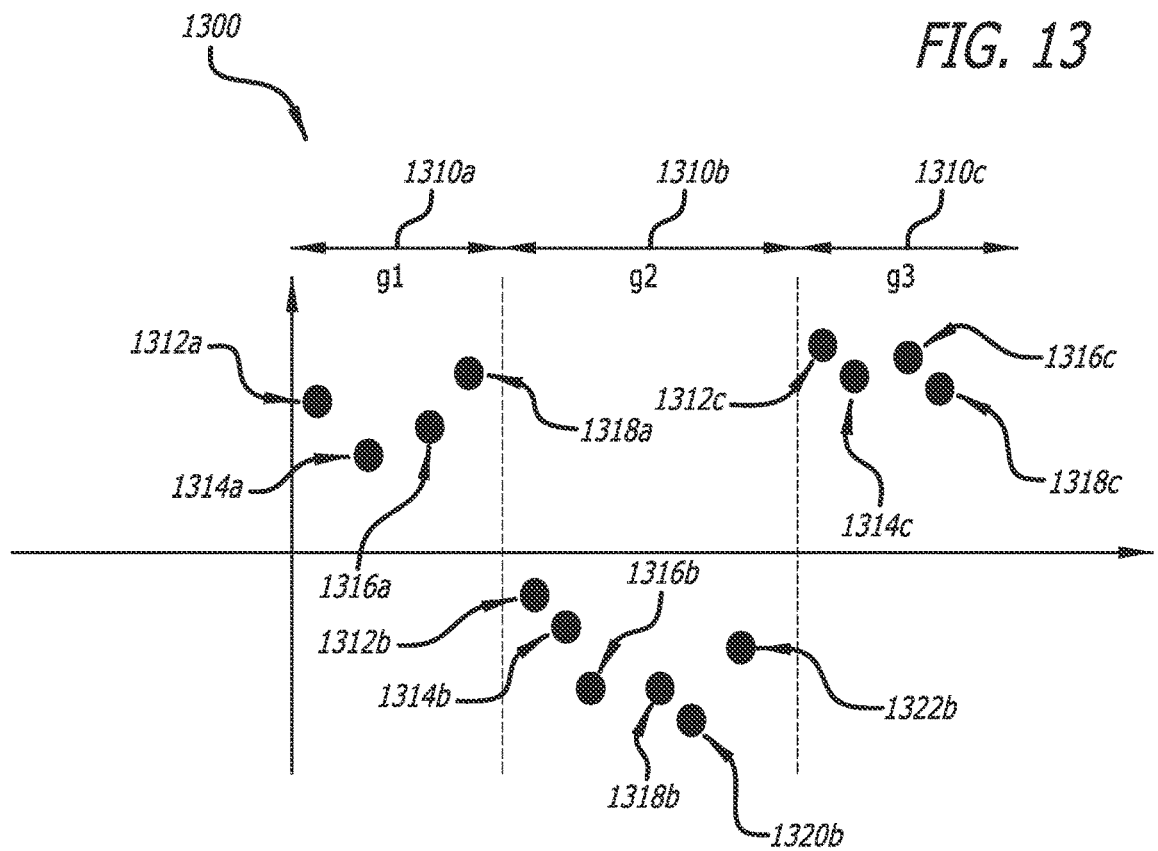
FIG. 13 is a representation illustrates embodiments of a hypothetical time series divided into different data partitions.

Referring to FIG. 13, a representation illustrates embodiments of a hypothetical time series 1300 divided into different data partitions is shown. As shown in FIG. 13, the data partitions may include different number of data points. Alternatively, some of the data partitions may include the same number of data points. As illustrated in FIG. 13, the time series is divided into three data partitions, $g_1$ 1310a which includes 4 data points (1312a, 1314a, 1316a, 1318a), $g_2$ 1310b which includes 6 data points (1312b, 1314b, 1316b, 1318b, 1320b, 1322b) and $g_3$ 1310c of unknown length (1312c, 1314c, 1316c, 1318c, . . . ). In some embodiments, within each data partition, the data points are drawn independently and identically distributed, i.e., each data point has the same probability distribution as the others and all data points are mutually independent. According to the disclosed method of detecting changepoints, a stream of observations $x_1$, $x_1$ . . . $x_T$ may be divided into non-overlapping data partitions g1, g2, g3.

The probability distribution is represented by:

$$P(x_t|\eta_g)$$

The parameters $\eta_g$, g=1, 2 . . . are also independently and identically distributed. However, it is worth mentioning that, between each data partition, the underlining data distributions can be different. The probability distribution of the changepoints and the non-changepoints will be discussed in details below.

Figure 14:
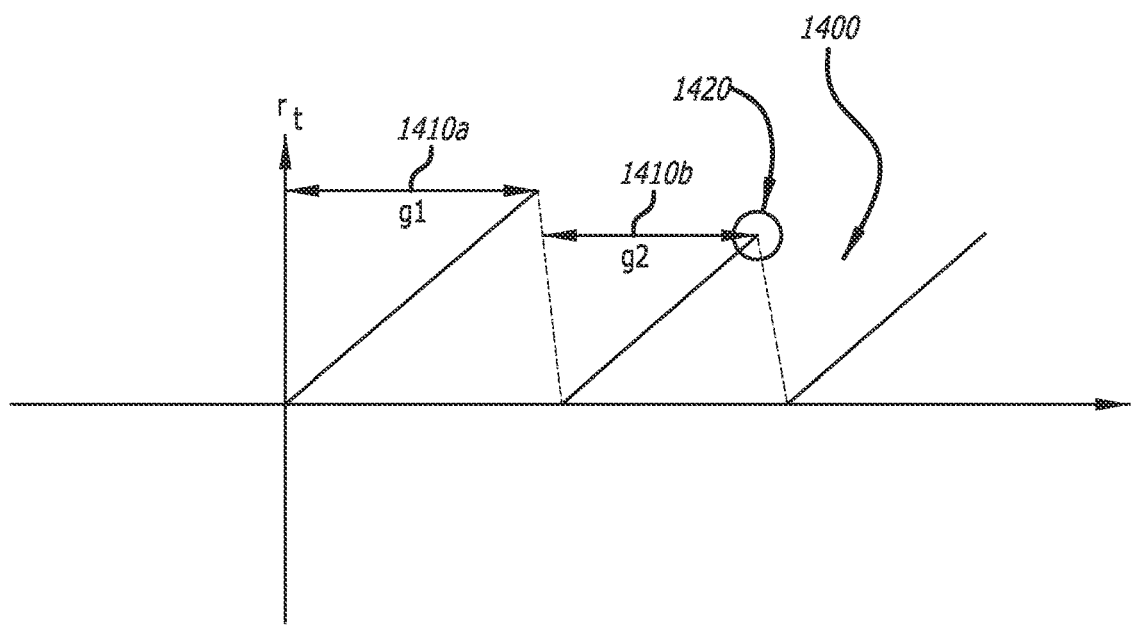
FIG. 14 is a graphical representation illustrating the relationship between a run length and the time series.

Referring now to FIG. 14, a graphical representation illustrating the relationship between a run length and the time series 1400 is shown. In order to detect changepoints, a run length $r_t$ is defined which is the time since the last changepoint has been detected. Thus, the larger the run length, the longer time since the last changepoint has occurred. According to disclosed method of detecting changepoints, once a changepoint is detected, the run length is set to zero, otherwise, the run length is increased by one. As a non-limiting example, the point 1420 is detected as a changepoint. The details of detecting changepoints based on run lengths will be discussed below.

Figure 15A:
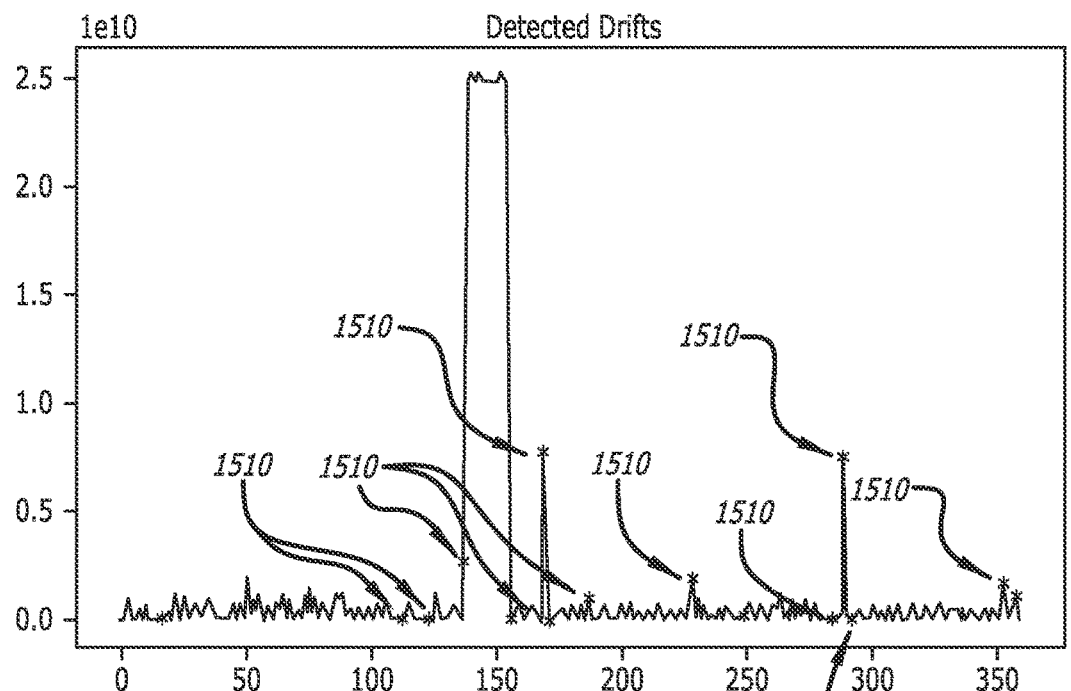
FIG. 15A is a graphical representation illustrating the performance of detecting changepoints using current methods.
Figure 15B:
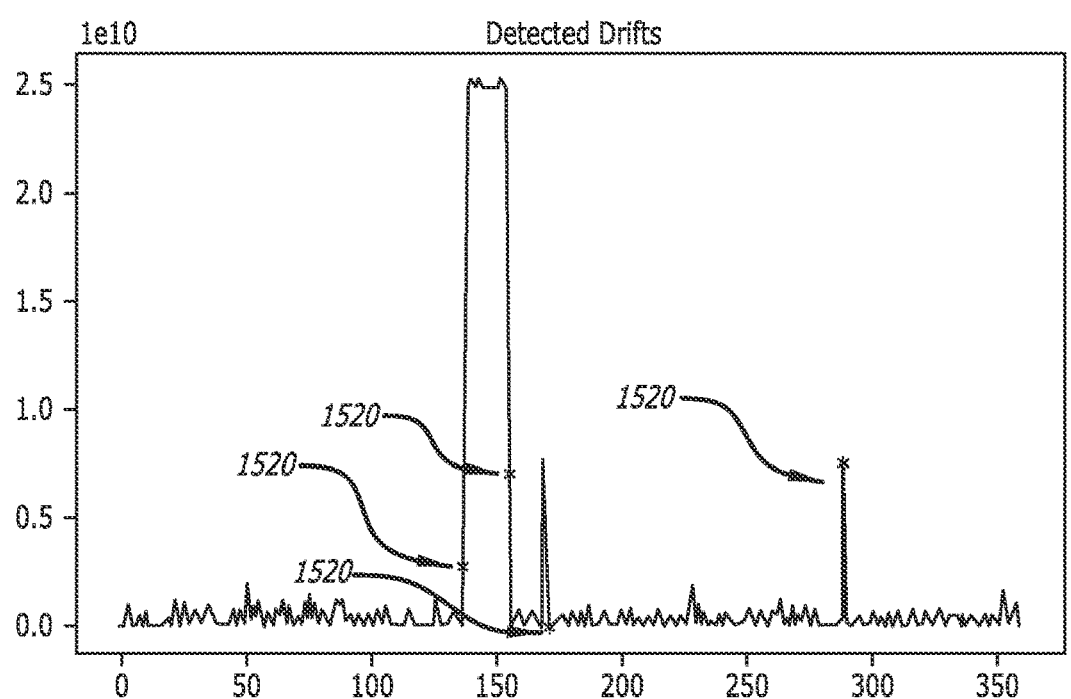
FIG. 15B is a graphical representation illustrating the performance of detecting changepoints using disclosed method.

Referring now to FIGS. 15A-15B, graphical representations illustrating a comparison between the performance of detecting changepoints using current methods and detecting changepoints using disclosed method. As shown in FIG. 15A, current changepoint detection methods suffer from false positive/false negative errors. While the conventional changepoint detection method may detect multiple changepoints in the data series, as can be seen, several false positive changepoints has also been detected in addition to the actual changepoints. FIG. 15B, on the other hand, shows the disclosed method for changepoint detection. As can be seen, the method of changepoint detection significantly improves accuracy of changepoint detection by detecting less false positives.

14.0. Continuous Drift Detection Component Operability

Figure 16:
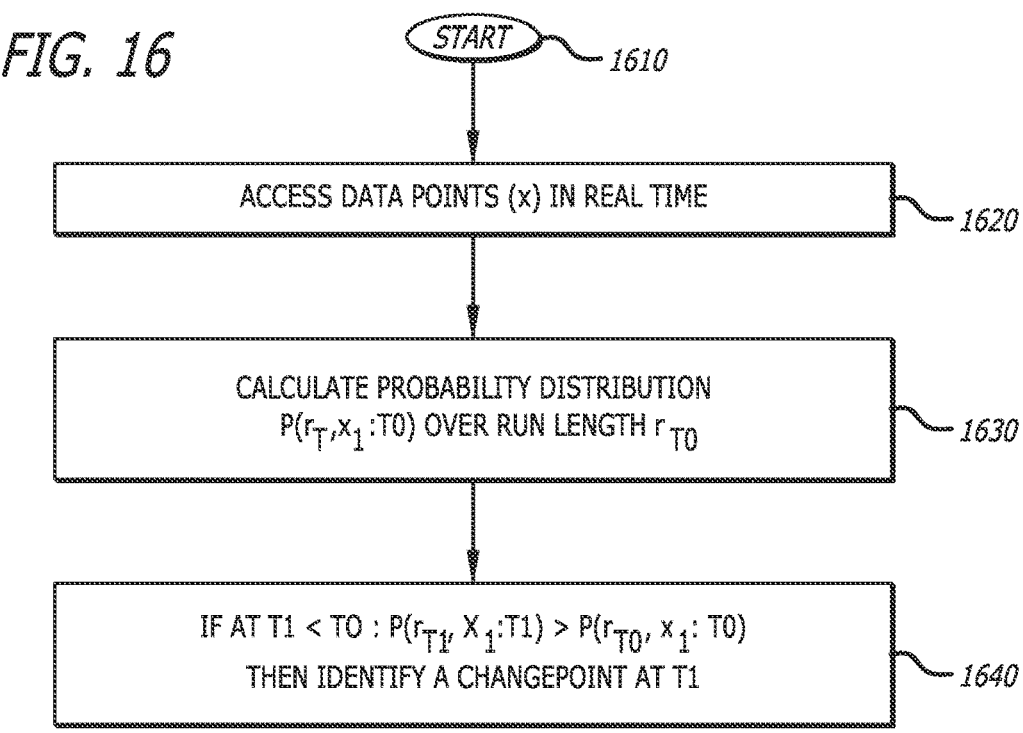
FIG. 16 is a graphical representation and operational flow associated with the functionality of an embodiment of a drift detection method utilized by the drift detection component of FIG. 11C.

Referring now to FIG. 16, a graphical representation and operational flow associated with the functionality of an embodiment of a drift detection method utilized by the drift detection component 1180 of FIG. 11C is shown. As represented at block 1620, once the drift detection method starts the drift detection method (block 1610), the drift detection component 1180 accesses data points in real time. To that end, the drift detection component 1180 divides the accessed data points by partitioning into two or more data partitions. While some of the data partitions may have the same number of data points, the size of each data partition is independent of other data partitions.

The drift detection component 1180 breaks down the data points into data partitions such that the data points within each data partition are chosen independent and identically distributed. The drift detection component 1180 may calculate the posterior distribution over the current run length r t given data points so far, as represented at block 1630. The posterior distribution of the current run length $P(r_t|x_{1:t})$ is calculated as:

$$P(r_t|x_{1:t}) = P(r_t, x_{1:t})/P(x_{1:t})$$

To calculate the posterior distribution, the drift detection component 1180 may determine a joint distribution over the run length and the observed data by:

$$P(r_t, x_{1:t}) = \sum_{r_{t-1}} P(r_t, r_{t-1}, x_{1:t}) = \sum_{r_{t-1}} P(r_t, x_t | r_{t-1}, x_{1:t-1}) P(r_{t-1}, x_{1:t-1}) = \sum_{r_{t-1}} P(r_t | r_{t-1}) P(x_t | r_{t-1}, x_t^{(r)}) P(r_{t-1}, x_{1:t-1})$$

The drift detection component 1180 may then integrate over the posterior distribution on the current run length to obtain the marginal predictive distribution:

$$P(x_{t+1}|x_{1:t})=\Sigma_{r_t}P(X_{t+1}|r_t,x^{(r)}_t)P(r_t|x_{1:t})$$

Utilizing the choice of conditional prior on the changepoint $P(r_t|r_{t-1})$ may enhance computational efficiency of the drift detection component 1180, since the run length has nonzero mass at only two outcomes: the run length either continues to grow at which time $r_t=r_{t-1}+1$ or a changepoint occurs at which point $r_t=0$. In other words, $P(r_t|r_{t-1})=$ if $r_t=0$ then $1/\lambda$ else if $r_t=r_{t-1+1}$ then $1-1/\lambda$ else 0

In the above equation, $\lambda$ is a prescribed constant. As a non-limiting example, $\lambda$ may be 0.5, which indicates that the probability distribution should exceed 50% for a data point to be identified as a changepoint.

As represented at block 1640, the drift detection component 1180 may determine whether the current run length has a maximum posteriori probability. If current run length has a maximum posteriori probability, then the drift detection component 1180 may determine that there is no changepoint until the point. Alternatively, if a run length less than the current run length has a maximum probability, then the drift detection component 1180 may determine that there is a changepoint occurred at the data point.

Figure 17:
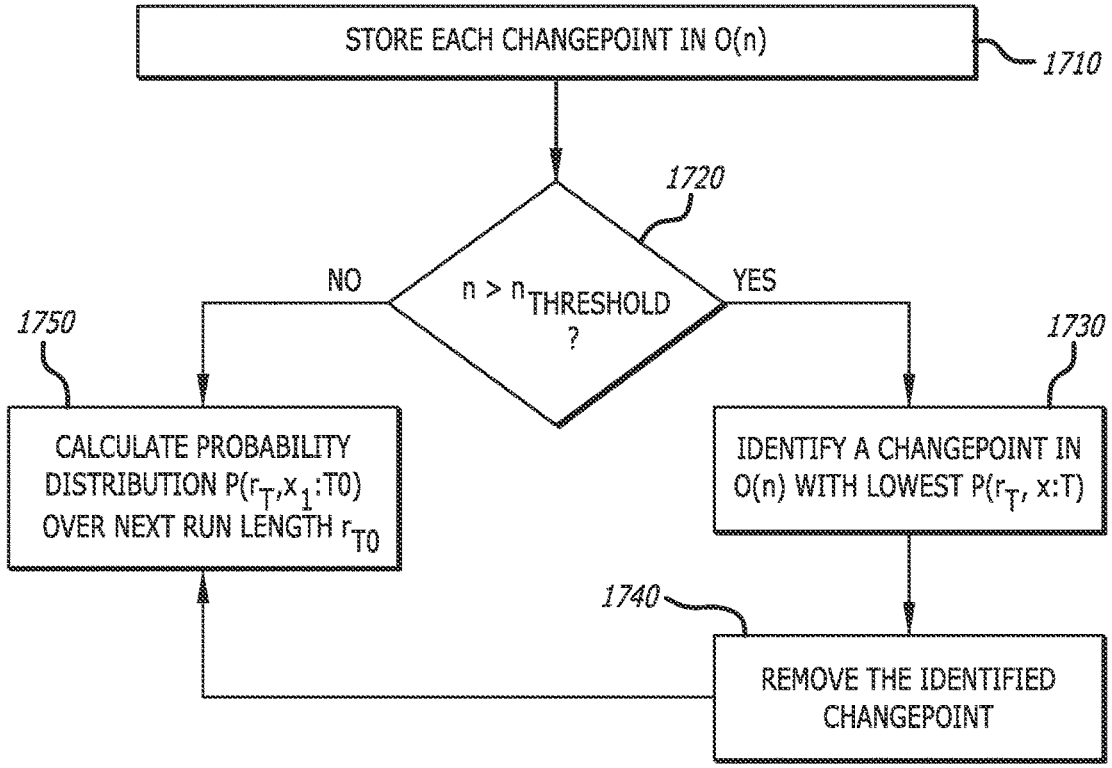
FIG. 17 is a graphical representation and operational flow associated with the functionality of an embodiment of a drift detection method utilized by the drift detection component of FIG. 11C.

Referring now to FIG. 17, a graphical representation and operational flow associated with the functionality of an embodiment of a drift detection method utilized by the drift detection component 1180 of FIG. 11C is shown. As represented at block 1710, the drift detection component 1180 stores a detected changepoint in the changepoint storage 1175. In order to eliminate the need to store all the runs from 1:t, which leads to an enormous usage of storage O(n), the changepoint storage 1175 is configured to store only the most probable run lengths in order to decide whether a changepoint has occurred in the past. Accordingly, the changepoint storage only stores a limited number of changepoints, i.e., $O(n_{Threshold})$.

To that end, as represented at block 1720, the changepoint storage 1175 may determine whether the number of stored changepoints exceeds $n_{Threshold}$. If $n>n_{Threshold}$, then the changepoint storage 1175 may identify the changepoint with lowest probability distribution, as represented at block 1730. Upon identifying the changepoint with the lowest probability distribution, the index corresponding to the least probable run, i.e., the changepoint with the lowest probability distribution, may be removed from the changepoint storage 1175, as represented at block 1740. As a non-limiting example, a window size of O(20) may be chosen, i.e., only 20 changepoints with highest probability distribution are stored on the changepoint storage 1175. More generally, the changepoint detection methodology detection disclosed herein results in a storage requirement of O(L), where L=20 in the example above. It should be noted, while in some embodiments, only 20 changepoints are stores in the changepoint storage 1175, in some embodiments, different umber of changepoints can be stored in the changepoint storage 1175. As represented at block 1750, once the changepoint with lowest probability distribution is removed from the changepoint storage 1175, or the changepoint storage 1175 determines that there is still room in the memory to store the changepoints, i.e., $n<n_{Threshold}$, then the drift detection component 1180 continues with calculating probability distribution over the next run length.

In other words, the changepoint storage 1175 is configured to maintain only a predefined fixed size buffer of size L. The drift detection component 1180 may store a record of the starting index of each run denoted as $[i_{r0}, i_{r1}, \ldots, i_{rL}]$. Accordingly, when a data point $x_j$ arrives, the current starting indices become $[i_{r0}, i_{r1}, \ldots, i_{rL}, j]$ with length L+1. By calculating the posterior run length probability at this point, the index with lowest probability (e.g., k) is removed from the changepoint storage 1175. Then, the starting indices become $[i_{r0}, i_{r1}, \ldots, i_{rk-1}, i_{rk+1}, \ldots, i_{rn}]$ with length again L. In this fashion, the run length starting at the index with lowest posterior probability is removed from the changepoint storage while keeping the memory usage fixed.

Referring now to FIG. 18, a graphical representation and operational flow associated with the functionality of an embodiment of a drift detection method utilized by the model tuning component 1185 of FIG. 11C is shown. As represented at block 1810, a student T-test distribution is obtained. For data streams originating from the normal distribution $(\mu, \tau)$, a non-informative conjugate prior normal-gamma with parameters $(\mu, \kappa, \alpha, \beta)$ may be used. Further, in a univariate case, a closed form posterior Student T-test distribution is obtained.

As represented at block 1820, for each $x_i$, the parameters of the model may be updated as follows:

$\alpha=\alpha+0.5$ $\beta=\beta+(\kappa(x_i-\mu)^2/(2(\kappa+1))$ $\mu=(\mu*\kappa+x_i)/(\kappa+1)$ $\kappa=\kappa+1$ By updating the parameters of the model, the model tuning component 1185 may minimize the false positive and/or false negative errors in changepoint detection, which may improve the accuracy and efficiency of the changepoint detection method. Once the parameters of the model are updated, the drift detection component 1180 continues with calculating probability distribution over the next run length, as represented at block 1830.

To detect changepoint for all the non-stationary cases, a multivariate normal distribution and normal inverse Wishart prior is defined, and thus, a closed form posterior is obtained. To further improve and conserve the same update rules as the univariate case, a posterior Student T distribution where the parameters updates are similar to the univariate case is used. For each $x_i$, $\alpha=\alpha+0.5$ $\beta=\beta+(\kappa(x_i-\mu)^2/(2(\kappa+1))$ $\mu=(\mu*\kappa+x_i)/(\kappa+1)$ $\kappa=\kappa+1$ The model performance evaluation component 1170 may use a mean absolute error with penalty as a metric. For any actual changepoints, e.g., $[\gamma_1, \gamma_2, \ldots, \gamma_j]$, and predicted changepoints, e.g., $[p_1, p_2, \ldots, p_k]$, with a total number of n data points, the mean absolute error is defined as:

loss=$|\gamma_i-p_i|$+penalty, where the penalty for false negative or false positive is:

penalty=$(j-k)_n$ if $j \geq K$ penalty=$|p_k|$ if $j<k$

The model performance evaluation component may calculate the loss between the closest point pairs $\gamma_i$ and $p_i$. In the case of false negatives, the number of data points that are missed by the detector may be penalized, which is the data length times the number of missed positives. Similarly, in the case of false positive, the excessive detected points may be penalized. As a result of tuning the parameters of the model, disclosed drift detection method may have two built-in properties. First, the drift detection method may preserve the same univariate drift detection result if taking variables one by one, without any loss of generality. Second, the drift detection method may detect covariance/correlation drift.

Referring now to FIG. 19, a graphical representation and operational flow associated with the functionality of an embodiment of a drift detection method utilized by the model tuning component 1185 of FIG. 11C is shown. As represented at block 1910, the drift detection component 1180 may determine whether or not a new changepoint is detected. If a new changepoint is detected, then the drift detection component 1180 may set the run length to zero, as represented at block 1920. Otherwise, if a new changepoint is not detected, then the drift detection component 1180 may increase the run length by 1, as represented at block 1930. In both scenarios, i.e., regardless a new changepoint is detected, the drift detection component may continue to calculate the probability distribution for the next run length, as represented at block 1940.

15.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory storage medium. Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

In certain instances, the terms "compare," comparing," "comparison," or other tenses thereof generally mean determining if a match (e.g., identical or a prescribed level of correlation) is achieved between data elements such as probability distributions, characteristic statistics, or the like.

The term "message" generally refers to as information placed in a prescribed format that is transmitted in accordance with a suitable delivery protocol or accessible through a logical data structure such as an Application Programming Interface (API). Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. For example, a message may be provided as one or more packets, frames, or any other series of bits having the prescribed, structured format.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory storage medium that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computerized method comprising:
   computing, by a drift detection subsystem using machine-learning models, a first probability distribution associated with content of a first data sample of a data stream and a second data sample of the data stream, the second data sample operating as a reference;
   computing, by the drift detection subsystem using machine-learning models, a second probability distribution associated with content of the second data sample;
   conducting analytics to compute a difference between content of the first probability distribution that is based on a first data point of the first data sample and content of the second probability distribution that is based on a first data point of the second data sample, wherein each data point of the first data sample, including the first data point, corresponds to machine data directed to a purpose separate and distinct from other data points of the first data sample;
   determining that categorical drift is occurring for the data stream in response to the difference failing to satisfy an error threshold; and in response to determining (a) that categorical drift is occurring and (b) that a prescribed number of data points associated with one or more data samples of the data stream identify potential categorical drift conditions, performing, by the drift detection subsystem (i) recomputing the error threshold with updated training data samples and (ii) issuing an alert message to an administrator indicating categorical drift is occurring.

2. The computerized method of claim 1, wherein the computing of the error threshold comprises (i) selecting one or more data samples associated with the training data samples, (ii) generating simulated samples based on content with the data samples in accordance with a bootstrap process, and (iii) computing one or more estimated characteristic statistics corresponding to the error threshold.

3. The computerized method of claim 2, wherein the one or more estimated characteristic statistics includes an estimated mean value for the data point included within one or more input fields of each of the simulated samples.

4. The computerized method of claim 1, wherein analytics comprising performing a distance function with the first probability distribution and the second probability distribution as inputs, the distance function generating a result including the difference between the content of the first probability distribution associated with the data point of the first data sample and content of the second probability distribution associated with the data point of the second data sample.

5. The computerized method of claim 1, wherein the determining that the categorical drift is occurring for the data stream in response to the difference being greater than the error threshold.

6. The computerized method of claim 1, wherein the first data point of the first data sample corresponds to content within at least a first input field of the first data sample and the first data point of the second data sample corresponds to content within at least a first input field of the second data sample.

7. The computerized method of claim 6, wherein either (1) the first data point of the first data sample corresponds to a first timestamp included within the first input field of the first data point of the first data sample and the first data point of the second data sample corresponds to a second timestamp included within the first input field of the first data point of the second data sample or (2) the content associated with the first data point of the first data sample corresponds to port information and the content associated with the first data point of the second data sample corresponds to port information.

8. The computerized method of claim 1, wherein determining that the categorical drift is occurring is based on a change in transport type between the one or more data samples of the data stream.

9. The computerized method of claim 1 further comprising:
monitoring for a number of data points of the second data sample upon which analytics are conducted and a categorical drift condition is determined for each of the data points;
including the second data sample as part of the training data samples in response to the categorical drift condition being detected for at least the number of data points of the second data sample; and
refraining from providing the second data sample for inclusion as part of the training data samples in response to the data points of the second data sample detected with the categorical drift condition is less than the number of data points.

10. The computerized method of claim 1, wherein a size of the first set of trained data samples is based on result analytics received from the customer, the result analytics including at least a number of false positives detected based on alert messages of detected categorical drift generated and provided to the customer.

11. A computing device, comprising:
one or more streaming data processors; and
a non-transitory storage medium having stored thereon an intake system being software including a plurality of components forming a drift detection subsystem, the drift detection subsystem comprises
a threshold modeling component configured to generate an error threshold based on a first set of training data samples selected to detect categorical drift occurring for a data stream;
a categorical drift detection component communicatively coupled to the threshold modeling component, the categorical drift detection component being configured to
compute a first probability distribution associated with content of a first data sample of the data stream and a second data sample operating as a reference,
compute a second probability distribution associated with content of the second data sample of the data stream,
conduct analytics to compute a difference between content of the first probability distribution that is based on a first data point of the first data sample and content of the second probability distribution that is based on a first data point of the second data sample, wherein each data point of the first data sample, including the first data point, corresponds to machine data directed to a purpose separate and distinct from other data points of the first data sample, and
determine that categorical drift occurring for the data stream in response to the difference failing to satisfy the error threshold,
wherein, in response to determining (a) that categorical drift is occurring and (b) that a prescribed number of data points associated with one or more data samples of the data stream identify potential categorical drift conditions, the drift detection subsystem (i) recomputing the error threshold with updated training data samples and (ii) issuing an alert message to an administrator indicating categorical drift is occurring.

12. The computing device of claim 11, wherein the threshold modeling component being configured to generate of the error threshold by at least (i) selecting one or more data samples associated with the training data samples, (ii) generating simulated samples based on content with the data samples in accordance with a bootstrap process, and (iii) computing one or more estimated characteristic statistics corresponding to the error threshold.

13. The computing device of claim 12, wherein the one or more estimated characteristic statistics includes an estimated mean value for the data point included within one or more input fields of each of the simulated samples.

14. The computing device of claim 11, wherein the analytics conducted by the categorical drift detection component comprises performing a distance function with the first probability distribution and the second probability distribution as inputs, the distance function generating a result including the difference between the content of the first probability distribution associated with the data point of the first data sample and content of the second probability distribution associated with the data point of the second data sample.

15. The computing device of claim 11, wherein the categorical drift detection component determines that the categorical drift is occurring for the data stream in response to the difference being greater than the error threshold.

16. The computing device of claim 11, wherein the first data point of the first data sample corresponds to content within at least a first input field of the first data sample and the first data point of the second data sample corresponds to content within at least a first input field of the second data sample.

17. The computing device of claim 16, wherein the first data point of the first data sample corresponds to a first timestamp included within the first input field of the first data point of the first data sample and the first data point of the second data sample corresponds to a second timestamp included within the first input field of the first data point of the second data sample.

18. The computing device of claim 16, wherein the content associated with the first data point of the first data sample corresponds to port information and the content associated with the first data point of the second data sample corresponds to port information.

19. The computing device of claim 11 wherein the categorical drift detection component is further configured to
monitor for a number of data points of the second data sample upon which analytics are conducted and a categorical drift condition is determined for each of the data points;
add the second data sample to the training data samples in response to the categorical drift condition being detected for at least the number of data points of the second data sample; and
refrain from adding the second data sample for inclusion as part of the training data samples in response to the data points of the second data sample being detected with the categorical drift condition is less than the number of data points.

20. The computing device of claim 11, wherein a size of the first set of trained data samples is based on result analytics received from the customer, the result analytics including at least a number of false positives detected based on alert messages of detected categorical drift generated and provided to the customer.

21. A non-transitory storage medium having stored thereon software that, when executed, is configured to perform operations including:

computing an error threshold based on a first set of training data samples selected to detect categorical drift occurring for a data stream;
computing, using machine-learning models, a first probability distribution associated with content of a first data sample of the data stream and a second data sample operating as a reference;
computing a second probability distribution associated with content of a second data sample of the data stream;
conducting analytics to compute a difference between content of the first probability distribution that is based on a first data point of the first data sample and content of the second probability distribution that is based on a first data point of the second data sample, wherein each data point of the first data sample, including the first data point, corresponds to machine data directed to a purpose separate and distinct from other data points of the first data sample;
determining that categorical drift occurring for the data stream in response to the difference failing to satisfy the error threshold; and
in response to determining (a) that categorical drift is occurring and (b) that a prescribed number of data points associated with one or more data samples of the data stream identify potential categorical drift conditions, the drift detection subsystem (i) recomputing the error threshold with updated training data samples and (ii) issuing an alert message to an administrator indicating categorical drift is occurring.

22. The non-transitory storage medium of claim 21, wherein the software computes the error threshold by at least (i) selecting one or more data samples associated with the training data samples, (ii) generating simulated samples based on content with the data samples in accordance with a bootstrap process, and (iii) computing one or more estimated characteristic statistics corresponding to the error threshold.

23. The non-transitory storage medium of claim 22, wherein the one or more estimated characteristic statistics includes an estimated mean value for the data point included within one or more input fields of each of the simulated samples.

24. The non-transitory storage medium of claim 21, wherein the analytics comprising performing a distance function with the first probability distribution and the second probability distribution as inputs, the distance function generating a result including the difference between the content of the first probability distribution associated with the data point of the first data sample and content of the second probability distribution associated with the data point of the second data sample.

* * * * *